US008270531B2

(12) United States Patent  (10) Patent No.: US 8,270,531 B2
Golitschek Edler Von Elbwart et al.  (45) Date of Patent: Sep. 18, 2012

(54) DATA TRANSMISSIONS IN A MOBILE COMMUNICATION SYSTEM EMPLOYING DIVERSITY AND CONSTELLATION REARRANGEMENT OF A 16 QAM SCHEME

(75) Inventors: Alexander Golitschek Edler Von Elbwart, Langen (DE); Christian Wengerter, Langen (DE); Isamu Yoshii, Langen (DE)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/073,736

(22) Filed: Mar. 28, 2011

(65) Prior Publication Data

US 2011/0255623 A1    Oct. 20, 2011

Related U.S. Application Data

(63) Continuation of application No. 11/913,475, filed as application No. PCT/EP2005/004891 on May 4, 2005, now Pat. No. 7,920,645.

(51) Int. Cl.
*H04L 27/36* (2006.01)
*H04L 5/12* (2006.01)

(52) U.S. Cl. ........................................ 375/298; 375/261

(58) Field of Classification Search .................. 375/261, 375/295, 298, 316, 340; 329/304; 332/103
See application file for complete search history.

(56) References Cited

U.S. PATENT DOCUMENTS

| | | | |
|---|---|---|---|
| 5,931,965 A | 8/1999 | Alamouti | |
| 6,195,396 B1 | 2/2001 | Fang | |
| 6,393,064 B1 * | 5/2002 | Nagai et al. | 375/259 |
| 6,438,112 B1 | 8/2002 | Piret | |
| 7,324,472 B2 | 1/2008 | Dottling | |
| 7,392,460 B2 * | 6/2008 | Kim et al. | 714/781 |
| 7,623,589 B2 * | 11/2009 | Oyman et al. | 375/267 |
| 7,929,633 B2 * | 4/2011 | Seo et al. | 375/267 |
| 2002/0199147 A1 | 12/2002 | Kim | |
| 2003/0012171 A1 * | 1/2003 | Schmidl et al. | 370/342 |
| 2005/0163040 A1 | 7/2005 | Wengerter | |

FOREIGN PATENT DOCUMENTS

| | | |
|---|---|---|
| EP | 0392538 | 10/1990 |
| EP | 0998087 | 5/2000 |
| WO | 2004/036817 | 4/2004 |

OTHER PUBLICATIONS

International Search Report dated Dec. 2, 2005.

* cited by examiner

*Primary Examiner* — Khanh C Tran
(74) *Attorney, Agent, or Firm* — Dickinson Wright PLLC

(57) ABSTRACT

The invention relates to methods for transmitting and receiving a data bit stream in a communication system using 16-QAM constellations. Further, an apparatus for performing the methods is provided. To improve the bit-error rate performance of the communication using the 16-QAM constellations the invention suggests the use 16-QAM constellations with specially selected mapping rules together with a special constellation rearrangement for creating different versions of the 16-QAM constellations. Further, the data stream is transmitted according to a diversity scheme employing different versions of the 16-QAM constellations obtained adhering the mapping rules and rearrangement rules defined by the invention.

14 Claims, 15 Drawing Sheets

Hamming distance

Squared Euclidean distance

DATA TRANSMISSIONS IN A MOBILE COMMUNICATION SYSTEM EMPLOYING DIVERSITY AND CONSTELLATION REARRANGEMENT OF A 16 QAM SCHEME

This is a continuation application of application Ser. No. 11/913,475 filed Jun. 3, 2008 now U.S. Pat. No. 7,920,645, which is a national stage of PCT/EP2005/004891 filed May 4, 2005, the entire contents of each which are incorporated by reference herein.

FIELD OF THE INVENTION

The invention relates to methods for transmitting and receiving a data bit stream in a communication system using a 16-QAM constellation and diversity rearrangement of the 16-QAM constellation. Further, an apparatus for performing the methods is provided.

TECHNICAL BACKGROUND

16-RAM

16-QAM (Quadrature Amplitude Modulation) is a digital modulation scheme which is commonly used for example in IMT 2000 based mobile communication systems, such as UMTS or COMA 2000. The 16 modulation symbols are defined by distinct points in the complex signal space in which the 16-QAM constellation is commonly illustrated. Each of these points represents one 16-QAM symbol.

For binary information transmission systems, four different bits may be used to determine one of the existing 16-QAM symbols. Therefore one 16-QAM symbol consists (or can be represented by a word) of 4 bits, and is represented by a complex value in the complex plane. Generally the complex value of a modulation symbol can be represented by its cartesian inphase- and quadrature-components (I and Q components) relative to the respective I-axis and Q-axis in the complex plane. These axes also divide the complex plane in four quadrants. The representation of a modulation symbol by its real and imaginary part in the complex plane is equivalent to its representation by polar components, i.e. radius and angle.

For a better understanding of the invention, it is assumed here a specific constellation of the 16-QAM symbols, where the signal points within a quadrant of the complex plane are arranged such that they form a square of four points in two orthogonal directions of the signal space. Consequently such a mapping is commonly known as square 16-QAM or lattice 16-QAM. Two examples are given in FIG. 1 and FIG. 2.

The Invention assumes that the 16-QAM symbols are arranged using a square 16-QAM mapping. It should be apparent to the skilled person that for each rotated 16-QAM constellation as for example shown in FIG. 2, the axes of the complex plane may be chosen such that the rotated 16-QAM constellation can be viewed as in FIG. 1.

Commonly, the so-called Gray mapping is used to associate the 16 modulation symbols in a 16-QAM constellation with a quadruple of bits which is mapped to the respective symbol. According to this Gray mapping scheme, adjacent modulation symbols in the horizontal or vertical direction differ in one bit only.

16-QAM Subset Partitioning

Generally the set of symbols within a constellation may be partitioned into subsets to define the symbol regions that correspond to the logical value of a certain bit. Since for a 16-QAM constellation 4 bits are relevant, there are four subsets, one for each bit. Each subset may be further divided into two symbol regions that correspond to the two logical values of the respective bit in the corresponding subset.

Obviously, there exist various subset partitions. However some of these are equivalent for example from the viewpoint of error rate performance. Still there exist certain partitioning schemes that are more widely used than others. Four examples of subset partitioning schemes are given for example in Chindapol, A.; Ritcey, J. A., "Design, analysis, and performance evaluation for BICM-ID with square QAM constellations in Rayleigh fading channels", IEEE Journal on Selected Areas in Communications, Volume: 19, Issue: 5, May 2001, Pages: 944-957 and also in FIG. 11 for so-called Gray mapping.

Constellation Rearrangement for 16-QAM Gray Mapping

For Gray mapping, it has been shown that a constellation rearrangement approach improves the performance if two or more versions of the same word are transmitted. The constellation rearrangement scheme for Gray mapping is based on different levels of reliability for the bits, depending on the position of the selected 16-QAM symbols within the constellation. Consequently the rearrangement rules focus on changing the location of the rearranged version of the 16-QAM symbol to achieve an averaging effect of the levels of reliability. For details on constellation rearrangement for 16-QAM Gray mapping, it is referred to the granted patent EP 1,293, 059 B1 or the publication WO 2004/036817 A1 of the applicant.

Transmit Diversity Schemes

There exist several well known transmit diversity techniques. The term "transmit diversity" as used in this document describes the transmission of one or several versions relating to identical data on several (at least two) diversity branches. For example the following schemes are considered as transmit diversity (see e.g. J. D. Gibson, "The Mobile Communications Handbook", IEEE Press, 1996, Chapter 12.2):

Site Diversity: The transmitted signal originates from different sites, e.g. different base stations in a cellular environment.

Antenna Diversity: The transmitted signal originates from different antennas, e.g. different antennas of a multi antenna base station.

Polarization Diversity: The transmitted signal is mapped onto different polarizations.

Frequency Diversity: The transmitted signal is mapped e.g. on different carrier frequencies or on different frequency hopping sequences.

Time Diversity: The transmitted signal is e.g. mapped on different interleaving sequences. This includes ARQ schemes that re-transmit data upon request.

Code Diversity: The transmitted signal is mapped on different codes in e.g. a CDMA (Code Division Multiple Access) system.

In the above referenced application and patent of the applicant respectively, it has been shown that the use of constellation rearrangement schemes together with transmit diversity may significantly improve the bit-error rate of a transmitted signal in mobile communication environments. It is shown to be optimum considering four different constellations for 16-QAM Gray mapping. Nevertheless, there is still a demand for an optimization of modulation and coding schemes used for communications, in particular in a mobile communication environment, to reduce the number of required constellations or to improve the achieved error performance.

SUMMARY OF THE INVENTION

It is therefore an object of the invention to provide a modulation and coding scheme with an improved bit-error rate compared to systems as described in the above referenced application and patent of the applicant. A further object of the invention is to provide a modulation and coding scheme requiring fewer constellations compared to systems as described in the above referenced application and patent of the applicant.

The object is solved by the subject matters of the independent claims. Advantageous embodiments are subject matter to the dependent claims.

One key aspect of the invention is to use a 16-QAM constellation with defined mapping rules together with a diversity scheme and a defined constellation rearrangement. The mapping rules define which of sixteen quadruples of bits (also referred to data words) is mapped to which modulation symbol (also referred to as data symbol) of the 16-QAM constellation. The 16 modulation symbols may for example be represented in four rows and four columns in a complex coordinate plane.

For example, the mapping rules may be formulated as follows:
a) a first one of the four data bits representing a modulation symbol selects one of two contiguous symbol regions of the 16-QAM constellation based on its logical value, each of the two contiguous symbol regions being formed by two rows adjacent to each other
b) a second one of the four data bits representing the respective modulation symbol selects one of two contiguous symbol regions of the 16-QAM constellation based on its logical value, each of the two contiguous symbol regions being formed by two columns adjacent to each other
c) a third one of the four data bits representing the respective modulation symbol selects one of two non-contiguous symbol regions of the 16-QAM constellation based on its logical value, each of the two non-contiguous symbol regions being formed by two rows not adjacent to each other
d) a fourth one of the four data bits representing the respective modulation symbol selects one of two non-contiguous symbol regions of the 16-QAM constellation based on its logical value, each of the two non-contiguous symbol regions being formed by two columns not adjacent to each other It is important to notice, that these mapping rules do not require that for example the most significant bit of a quadruple of bits representing a modulation symbol selects a specific one the regions defined in the rules above according to its logical value. Which bit of the quadruple selects which of the four symbol regions defined within four above mentioned mapping rules does not have an impact on the performance of the modulation and coding scheme proposed by the invention.

An alternative definition of the mapping rules, equivalent to the rules a), b), c) and d) above, may be formulated as follows. It is assumed that the axes of the complex plane in which the square 16-QAM constellation can be represented are chosen as shown in FIG. 1. The axes divide the complex signal space in four quadrants. Assuming this representation of the 16-QAM constellation, the mapping rules of the QAM constellation fulfill the following criteria:
a') the Hamming distance between modulation symbols within a quadrant having the minimum Euclidian distance to each other is one
b') the Hamming distance between modulation symbols of adjacent quadrants having the minimum Euclidian distance to each other is two and
c') the modulation symbols being antipodal to each other with respect to the origin of the complex coordinate plane have a Hamming distance of four Moreover, the following additional rules may be taken into account:
d') the modulation symbols within a quadrant having an Euclidian distance larger than the minimum Euclidian distance or equal to the square root of two times the minimum Euclidian distance to each other within the quadrant have a Hamming distance of two
e') the Hamming distance between modulation symbols having an Euclidian distance larger than the minimum Euclidian distance or equal to the square root of two times the minimum Euclidian distance to each other of and being located in adjacent quadrants is three In addition to these alternative but equivalent mapping rules, another aspect of the invention is to employ transmit diversity scheme together with a 16-QAM constellation rearrangement. Each quadruple of bits is transmitted two or more times, wherein differently arranged versions of 16-QAM constellations obeying the mapping rules (versions) above are used for transmitting the quadruple of bits according to the transmit diversity scheme used. The versions of the 16-QAM constellation are rearranged based on the following diversity rearrangement rules:
1. A modulation symbol that has two nearest neighbors in the first version is rearranged such that it has four nearest neighbors in the second version
2. A modulation symbol of the 16-QAM constellation that has three nearest neighbors in the first version is rearranged such that it has three nearest neighbors in the second version
3. A modulation symbol of the 16-QAM constellation that has four nearest neighbors in the first version is rearranged such that it has two nearest neighbors in the second version More specifically, these rearrangement rules may be alternatively defined as follows:
1. Two modulation symbols that have a Hamming distance of 1 and a squared Euclidean distance of 4D in the first version have a squared Euclidean distance of 16D in the second version, and vice versa
2. Two modulation symbols that have a Hamming distance of 2
   and a squared Euclidean distance of 4D in the first version have a squared Euclidean distance of 38D in the second version, and vice versa
   and a squared Euclidean distance of 8D in the first version have a squared Euclidean distance of 32D in the second version, and vice versa
   and a squared Euclidean distance of 20D in the first version have a squared Euclidean distance of 20D in the second version
3. Two modulation symbols that have a Hamming distance of 3
   and a squared Euclidean distance of 8D in the first version have a squared Euclidean distance of 52D in the second version, and vice versa
   and a squared Euclidean distance of 20D in the first version have a squared Euclidean distance of 40D in the second version, and vice versa
4. Two modulation symbols that have a Hamming distance of 4
   and a squared Euclidean distance of 8D in the first version have a squared Euclidean distance of 72D in the second version, and vice versa
   and a squared Euclidean distance of 40D in the first version have a squared Euclidean distance of 40D in the second version According to a first exemplary embodiment of the invention a method for transmitting a data bit stream in a communication system using a first and a second 16-QAM constellation each having 16 modulation symbols that can be represented in four rows and four columns in a complex coordinate plane is provided. According to this embodiment, each modulation symbol of the 16-QAM constellations can be represented by a combination of four data bits. Further, the two constellations obey the mapping rules as specified above (see a) to d)).

The method according to this embodiment may thereby comprise the step of forming a sequence of data words from the data bit stream. Each of the data words is then mapped to a modulation symbol of a first 16-QAM constellation to obtain a first diversity arrangement version obeying the mapping rules, and each of the data words is further mapped to a modulation symbol of a second 16-QAM constellation to obtain a second diversity arrangement version obeying the mapping rules.

The first and second 16-QAM constellation according to this embodiment of the invention is obtained additionally obeying the following rearrangement rules. A modulation symbol of the first 16-QAM constellation having two nearest neighbors is rearranged such that it has four nearest neighbors in the second 16-QAM constellation. Further, a modulation symbol of the first 16-QAM constellation having three nearest neighbors is rearranged such that it has three nearest neighbors in the second 16-QAM constellation. Moreover, a modulation symbol of the first 16-QAM constellation having four nearest neighbors is rearranged such that it has two nearest neighbors in the second 16-QAM constellation.

The modulation symbol of the first 16-QAM constellation and the modulation symbol of the second 16-QAM constellation are transmitted according to a transmit diversity scheme.

According to another embodiment of the invention, the second 16-QAM constellation is obtained by:
    rearranging two modulation symbols having a Hamming distance of one and a squared Euclidean distance of 4D in the first 16-QAM constellation to modulation symbols having a squared Euclidean distance of 16D in the second 16-QAM constellation, and vice versa,
    rearranging two modulation symbols having a Hamming distance of two and a squared Euclidean distance of 4D in the first 16-QAM constellation to modulation symbols having a squared Euclidean distance of 36D in the second 16-QAM constellation, and vice versa,
    rearranging two modulation symbols having a Hamming distance of two and a squared Euclidean distance of 8D in the first 16-QAM constellation to modulation symbols having a squared Euclidean distance of 32D in the second 16-QAM constellation, and vice versa,
    rearranging two modulation symbols having a Hamming distance of two and a squared Euclidean distance of 20D in the first 16-QAM constellation to modulation symbols having a squared Euclidean distance of 20D in the second 16-QAM constellation,
    rearranging two modulation symbols having a Hamming distance of three and a squared Euclidean distance of 8D in the first 16-QAM constellation to modulation symbols having a squared Euclidean distance of 52D in the second 16-QAM constellation, and vice versa,
    rearranging two modulation symbols having a Hamming distance of three and a squared Euclidean distance of 20D in the first 16-QAM constellation to modulation symbols having a squared Euclidean distance of 40D in the second 16-QAM constellation, and vice versa,
    rearranging two modulation symbols having a Hamming distance of four and a squared Euclidean distance of 8D in the first 16-QAM constellation to modulation symbols having a squared Euclidean distance of 72D in the second 16-QAM constellation, and vice versa, and
    rearranging two modulation symbols having a Hamming distance of four and a squared Euclidean distance of 40D in the first 16-QAM constellation to modulation symbols having a squared Euclidean distance of 40D in the second 16-QAM constellation,
as has been already outlined previously.

The complex plane in which the 16-QAM symbols may be represented comprises four quadrants and, according to a further embodiment of the invention, the mapping rules obeyed by the first and second 16-QAM constellation fulfill the following criteria:
    the Hamming distance between modulation symbols within a quadrant having the minimum squared Euclidian distance to each other is one,
    the Hamming distance between modulation symbols of adjacent quadrants having the minimum squared Euclidian distance to each other is two and
    wherein modulation symbols being antipodal to each other with respect to the origin of the complex coordinate plane have a Hamming distance of four.

In a variation of this embodiment, the modulation symbols within a quadrant having a squared Euclidian distance larger than the minimum squared Euclidian distance or equal to the square root of two times the minimum squared Euclidian distance to each other within the quadrant have a Hamming distance of two.

Moreover, according to another variation of the embodiment, the Hamming distance between modulation symbols having a squared Euclidian distance larger than the minimum squared Euclidian distance or equal to the square root of two times the minimum squared Euclidian distance to each other of and being located in adjacent quadrants is three.

In another embodiment of the invention, the data bit stream may be encoded by an encoder prior to forming the data words.

According to one further embodiment, a diversity scheme is employed for data transmission, according to which the modulation symbol mapped to the first 16-QAM constellation and the modulation symbol mapped to the second 16-QAM constellation are transmitted in parallel to each other.

Another alternative diversity scheme that can be employed foresees that the modulation symbol mapped to the first 16-QAM constellation and the modulation symbol mapped to the second 16-QAM constellation are transmitted at different time instances.

Further, the present invention according to another embodiment provides a method for receiving a data bit stream in a communication system. The data bit stream is transmission data having been transmitted by a transmitting apparatus using a transmit diversity scheme and having been modulated by the transmitting apparatus using a first and a second 16-QAM constellation. Each of these two constellations has 16 modulation symbols that can be represented in four rows and four columns in a complex coordinate plane. Moreover, each modulation symbol of the first and second 16-QAM constellation can be selected by a combination of four data bits. The two 16-QAM constellations each obey the mapping rules as specified above (see a) to d)).

According to this embodiment of the invention, a transmission signal comprising a data word of the data bit stream that has been transmitted by the transmitting apparatus using the first 16-QAM constellation is received at a receiving apparatus. Further, another transmission signal comprising the data word of the data bit stream and having been transmitted using the second 16-QAM constellation is also received.

Next, the transmission signals are demodulated by detecting modulation symbols represented by data words of four data bits using the first 16-QAM constellation and the second 16-QAM constellation respectively. Thereby, each data bit of a received modulation symbol is associated with a metric indicating the probability of the logical value of the respective bit of the received modulation symbol or indicating the logical value of the respective bit of the received modulation symbol.

Next, each data bit of the received modulation symbols that has been mapped by the transmitting apparatus to the first 16-QAM constellation is associated to a data bit of the received modulation symbols that has been mapped by the transmitting apparatus to the second 16-QAM constellation.

Further, each data bit having been mapped the first 16-QAM constellation is combined with its associated data bit having been mapped to the second 16-QAM constellation based on the metric of the respective data bit and the metric of the associated data bit to reconstruct the data bit stream.

In this embodiment of the invention, the association of data bits within the received modulation symbols is based on the following association rules:
    each data bit of a modulation symbol of the first 16-QAM constellation having two nearest neighbors in the first 16-QAM constellation is associated to the respective data bit in a modulation symbol of the second 16-QAM constellation having four nearest neighbors in the second 16-QAM constellation
    each data bit of a modulation symbol of the first 16-QAM constellation having three nearest neighbors in the first 16-QAM constellation is associated to the respective data bit in a modulation symbol of the second 16-QAM constellation having three nearest neighbors in the second 16-QAM constellation
    each data bit of a modulation symbol of the first 16-QAM constellation having four nearest neighbors in the first 16-QAM constellation is associated to the respective data bit in a modulation symbol of the second 16-QAM constellation having two nearest neighbors in the second 16-QAM constellation.

Another embodiment of the invention relates to the use of the different embodiments of the transmission method described above in a transmitting apparatus. A transmitting apparatus for transmitting a data bit stream in a communication system using a first and a second 16-QAM constellation is provided. Each of the two constellations has 16 modulation symbols that can be represented in four rows and four columns in a complex coordinate plane and obey the mapping rules defined previously (see a) to d) above).

Transmitting apparatus comprises a processing means, e.g. a processor, DSP, or specialized hardware-component, for forming a sequence of data words from the data bit stream. The data stream may for example be provided from a speech coder, an software application, or any other source that desires to transmit the data bit stream to a receiving apparatus.

Further, the transmitting apparatus comprises a symbol mapper for mapping each data word to a modulation symbol of a first 16-QAM constellation to obtain a first diversity arrangement version obeying the mapping rules, and for mapping each data word to a modulation symbol of a second 16-QAM constellation to obtain a second diversity arrangement version obeying the mapping rules. Thereby, a constellation rearrangement means, which may or may not be equivalent to the processing means mentioned above, in order to allow the transmitting apparatus obtaining the first and second 16-QAM constellation by obeying the following rearrangement rules:
    a modulation symbol of the first 16-QAM constellation having two nearest neighbors is rearranged such that it has four nearest neighbors in the second 16-QAM constellation
    a modulation symbol of the first 16-QAM constellation having three nearest neighbors is rearranged such that it has three nearest neighbors in the second 16-QAM constellation.
    a modulation symbol of the first 16-QAM constellation having four nearest neighbors is rearranged such that it has two nearest neighbors in the second 16-QAM constellation Moreover, the transmitting apparatus may comprise a transmitter for transmitting the modulation symbol of the first 16-QAM constellation and the modulation symbol of the second 16-QAM constellation according to a transmit diversity scheme.

Another embodiment of the invention provides transmitting apparatus comprising means adapted to perform the steps of the transmission method according to one of the embodiments and variations thereof described above.

A further embodiment of the invention relates to the use of the reception method outlined above. A receiving apparatus for receiving a data bit stream in a communication system is provided, wherein the data bit stream has been transmitted by a transmitting apparatus using transmit diversity. The data bit stream has been modulated by the transmitting apparatus using a first and a second 16-QAM constellation. The first and the second 16-QAM constellation can be represented in four rows and four columns in a complex coordinate plane and each of their modulation symbols can be represented by a combination of four data bits. The two 16-QAM constellations each obey the mapping rules as specified previously in a) to d).

The receiving apparatus according to this embodiment may comprise a receiver for receiving a transmission signal comprising a data word of the data bit stream having been transmitted using the first 16-QAM constellation, and for receiving a transmission signal comprising the data word of the data bit stream having been transmitted using the second 16-QAM constellation.

Further the receiving apparatus may comprise a demodulator for demodulating the transmission signal by detecting modulation symbols represented by data words of four data bits using the first 16-QAM constellation and the second 16-QAM constellation respectively. When demodulating, each data bit of a received modulation symbol is associated with a metric indicating the probability of the logical value of the respective bit of the received modulation symbol or indicating the logical value of the respective bit of the received modulation symbol.

Further, the apparatus may comprise a data bit stream reconstruction means, for example a processor, DSP or any other kind of suitable hardware and/or software, for associating each data bit of the received modulation symbols that has been mapped by the transmitting apparatus to the first 16-QAM constellation to a data bit of the received modulation symbols that has been mapped by the transmitting apparatus to the second 16-QAM constellation, and for combining each data bit having been mapped the first 16-QAM constellation with its associated data bit having been mapped to the second 16-QAM constellation based on the metric of the respective data bit and the metric of the associated data bit to reconstruct the data bit stream.

The data bit stream reconstruction means is further adapted to base the association of data bits within the received modulation symbols on the following association rules:

- each data bit of a modulation symbol of the first 16-QAM constellation having two nearest neighbors in the first 16-QAM constellation is associated to the respective data bit in a modulation symbol of the second 16-QAM constellation having four nearest neighbors in the second 16-QAM constellation
- each data bit of a modulation symbol of the first 16-QAM constellation having three nearest neighbors in the first 16-QAM constellation is associated to the respective data bit in a modulation symbol of the second 16-QAM constellation having three nearest neighbors in the second 16-QAM constellation
- each data bit of a modulation symbol of the first 16-QAM constellation having four nearest neighbors in the first 16-QAM constellation is associated to the respective data bit in a modulation symbol of the second 16-QAM constellation having two nearest neighbors in the second 16-QAM constellation.

Moreover, in another embodiment of the invention, the receiving apparatus may comprise further components and means for operation according to one of the more specific coding and modulation schemes proposed by the invention.

It is also recognized that the invention according to the various embodiments and variations thereof may be implemented in software and/or hardware. Therefore, another embodiment of the invention relates to a computer readable medium storing instructions that, when executed by a processor of a transmitting apparatus, cause the transmitting apparatus to transmit a data bit stream in a communication system using a first and a second 16-QAM constellation. Each of the constellations has 16 modulation symbols that can be represented in four rows and four columns in a complex coordinate plane. Each modulation symbol of the 16-QAM constellations can be represented by a combination of four data bits. The first and second 16-QAM constellation each obey the mapping rules defined by a) through d) above.

The instructions cause the transmitting apparatus to transmit a data bit stream by forming a sequence of data words from the data bit stream, mapping each data word to a modulation symbol of a first 16-QAM constellation to obtain a first diversity arrangement version obeying the mapping rules, and mapping each data word to a modulation symbol of a second 16-QAM constellation to obtain a second diversity arrangement version obeying the mapping rules. The first and second 16-QAM constellation is obtained additionally obeying the following rearrangement rules:

- a modulation symbol of the first 16-QAM constellation having two nearest neighbors is rearranged such that it has four nearest neighbors in the second 16-QAM constellation
- a modulation symbol of the first 16-QAM constellation having three nearest neighbors is rearranged such that it has three nearest neighbors in the second 16-QAM constellation.
- a modulation symbol of the first 16-QAM constellation having four nearest neighbors is rearranged such that it has two nearest neighbors in the second 16-QAM constellation Moreover, the instructions when executed by the processor cause the transmitting apparatus to transmit the modulation symbol of the first 16-QAM constellation and the modulation symbol of the second 16-QAM constellation according to a transmit diversity scheme.

Another embodiment of the invention relates to a computer readable medium storing instruction that, when executed by the processor of the transmitting apparatus, cause the transmitting apparatus to perform the steps of the transmission method according to one of the various embodiments and variations thereof above.

Another embodiment of the invention relates to a computer readable medium storing instruction that, when executed by a transmitting apparatus, cause the transmitting apparatus to receive a data bit stream in a communication system. The data bit stream has been transmitted by a transmitting apparatus using transmit diversity and has been modulated by the transmitting apparatus using a first and a second 16-QAM constellation each having 16 modulation symbols. As outlined previously the first and the second 16-QAM constellation may be represented in four rows and four columns in a complex coordinate plane, and each modulation symbol of the first and second 16-QAM constellation may be represented by a combination of four data bits. Further, the 16-QAM constellations each obey the mapping rules defined in a) to d) above.

The instruction cause the receiving apparatus to receive the data bit stream by receiving a transmission signal comprising a data word of the data bit stream having been transmitted using the first 16-QAM constellation, receiving a transmission signal comprising the data word of the data bit stream having been transmitted using the second 16-QAM constellation, demodulating the transmission signal by detecting modulation symbols represented by data words of four data bits using the first 16-QAM constellation and the second 16-QAM constellation respectively, thereby associating each data bit of a received modulation symbol with a metric indicating the probability of the logical value of the respective bit of the received modulation symbol or indicating the logical value of the respective bit of the received modulation symbol, associating each data bit of the received modulation symbols that has been mapped by the transmitting apparatus to the first 16-QAM constellation to a data bit of the received modulation symbols that has been mapped by the transmitting apparatus to the second 16-QAM constellation, and combining each data bit having been mapped the first 16-QAM constellation with its associated data bit having been mapped to the second 16-QAM constellation based on the metric of the respective data bit and the metric of the associated data bit to reconstruct the data bit stream, wherein the association of data bits within the received modulation symbols is based on the following association rules:

- each data bit of a modulation symbol of the first 16-QAM constellation having two nearest neighbors in the first 16-QAM constellation is associated to the respective data bit in a modulation symbol of the second 16-QAM constellation having four nearest neighbors in the second 16-QAM constellation
- each data bit of a modulation symbol of the first 16-QAM constellation having three nearest neighbors in the first 16-QAM constellation is associated to the respective data bit in a modulation symbol of the second 16-QAM constellation having three nearest neighbors in the second 16-QAM constellation
- each data bit of a modulation symbol of the first 16-QAM constellation having four nearest neighbors in the first 16-QAM constellation is associated to the respective data bit in a modulation symbol of the second 16-QAM constellation having two nearest neighbors in the second 16-QAM constellation.

BRIEF DESCRIPTION OF THE FIGURES

In the following the present invention is described in more detail in reference to the attached figures and drawings. Similar or corresponding details in the figures are marked with the same reference numerals.

DETAILED DESCRIPTION OF THE INVENTION

The following paragraphs will describe various embodiments of the present invention. For exemplary purposes only, most of the embodiments are outlined independent from their implementation in a mobile environment.

Also the detailed explanations given in the Technical Background section above are merely intended to better understand the exemplary embodiments described in the following and should not be understood as limiting the present invention to the described specific implementations of processes and functions in the mobile communication network.

One aspect of the invention is the definition of mapping rules of the 16-QAM constellation. For a better understanding of the further elaboration on the properties of the new mapping—to which will be referred to as "AICO mapping" in this document—, the definitions of several terms frequently used in the following are provided first.

The Hamming weight of a symbol composed of binary elements 0 and 1 (alternatively denoted −1 and 1) is the number of non-zero (i.e. 1) elements within a word composed of binary elements. Consequently for any 4-bit word that is mapped onto a 16-QAM symbol the Hamming weight can be an integer value of 0 (i.e. for the word "0000"), of 1 (e.g. for the word "0010"), of 2 (e.g. for the word "1010"), of 3 (e.g. for the word "1110"), or of 4 (i.e. for the word "1111"). An even Hamming weight value is also denoted an "even Hamming weight parity", an odd Hamming weight value is denoted an "odd Hamming weight parity".

The Hamming distance between two symbols composed of one or more binary digits is the number of digits in which the position-wise comparison of the digit value is different. Consequently the words "0000" and "1111" have a Hamming distance of 4, since all four digits have different values. The words "1000" and "0010" have a Hamming distance of two, since the first and third digit from the left have different values.

Figure 3:
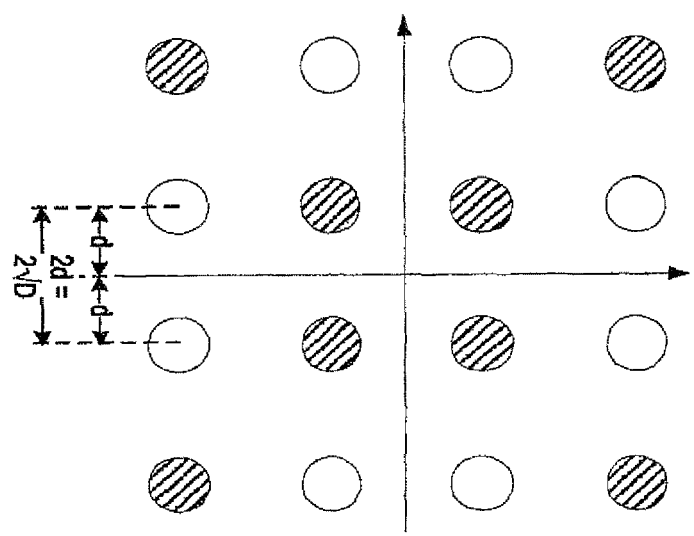
FIG. 3 shows a representation of the partitioning of constellation points for even and odd Hamming weight words in the complex signal space.

The proposed AICO mapping fulfills the following properties that are explained with reference to FIG. 3:

a") All words that have a first Hamming weight parity are unambiguously mapped either onto the dashed or the white modulation symbols in FIG. 3, b") All words that have a second Hamming weight parity are unambiguously mapped either onto the dashed or the white modulation symbols in FIG. 3.

c") The above two properties are complementary to each other, i.e. if the even Hamming weight words are mapped onto the dashed modulation symbols, then the odd Hamming weight words are mapped onto the white modulation symbols.

d") Rotation of a first constellation symbol by 180 degrees shall result in a second constellation symbol that conveys a second word that is the binary complement of the first word that is conveyed by the first constellation symbol.

Figure 4:
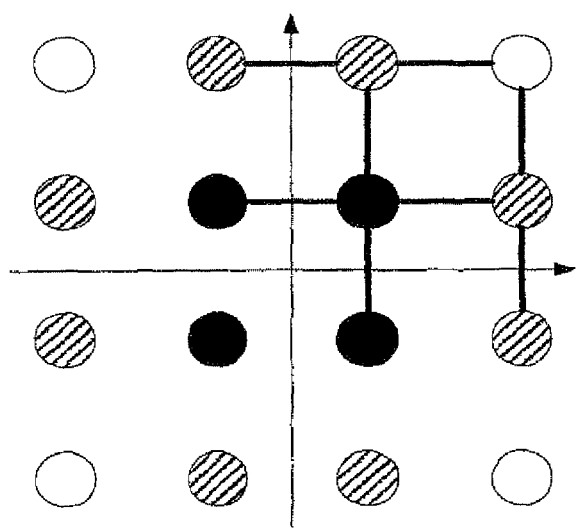
FIG. 4 shows the nearest neighbour properties of the symbols within a square 16-QAM constellation.
Figure 4:
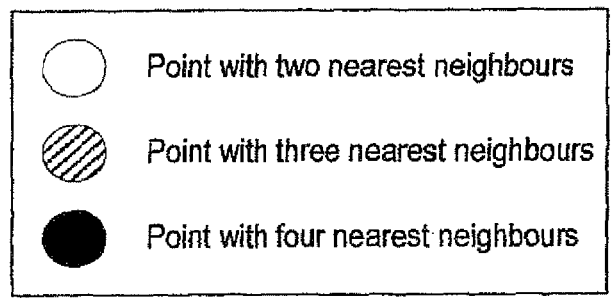

As can be seen in FIG. 4, each symbol in a 16-QAM constellation has two, three or four nearest neighbor symbols. Therefore the first two properties above may be reformulated as follows:

a'") All words that have a first Hamming weight parity are unambiguously mapped either onto modulation symbols with two nearest neighbors or with four nearest neighbors.

b'") All words that have a second Hamming weight parity are unambiguously mapped onto modulation symbols with three nearest neighbors.

A noteworthy consequence of these properties is that the Gray principle for closest neighboring symbols is violated in some cases. Therefore, this mapping proposed by the Invention may also be referred to as a non-Gray mapping. The last property of the AICO mapping rules above means that antipodal constellation symbols carry words that are binary inverted. Therefore this mapping is referred to as Antipodal Inverted Constellation Mapping, or AICO mapping in this document. A consequence of the non-Gray characteristic lathe difference of symbol regions which specific bits select.

FIG. 9 to FIG. 12 show an exemplary correspondence of the individual bits of a data word to symbol regions in the representation of the 16-QAM constellation in the complex plane according to an embodiment of the invention; i.e. the selection of one of the respective symbol regions based on the logical value of a respective bit in the data word. FIG. 9 to FIG. 12 thereby visualize, how an individual bit of a quadruple of data bits mapped to a corresponding modulation symbol selects one of the different symbol regions based on its logical value.

Within FIG. 9 to FIG. 12, $S_i^j$ denotes a symbol region, where j is the index denoting data bit number 1, 2, 3, or 4 of a quadruple of data bits to be mapped, and i denotes the logical bit value, either b or its inverse $\bar{b}$. Those skilled in the art will appreciate that in this general representation the actual logical bit value (0 or 1, alternatively −1 and 1) or bit position within the data word is of no relevance.

Figure 9:
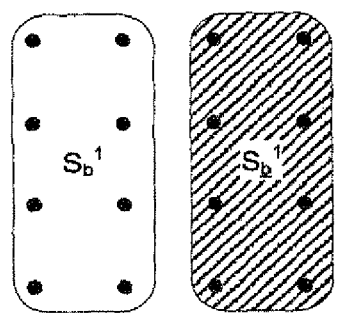
FIG. 9 to 12 show exemplary regional mappings of the four constituent bits (data word) to their respective symbols in a square 16-QAM constellation using AICO mapping according to an exemplary embodiment of the invention.
Figure 10:
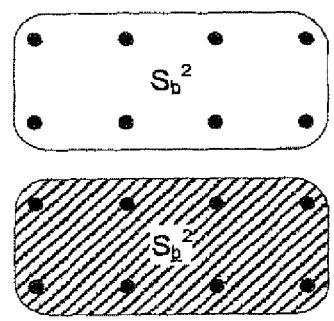

In FIG. 9 an exemplary correspondence of a first data bit of the quadruple of bits to one of two vertically contiguous symbol regions $S_b^1$ and $S_{\bar{b}}^1$ is shown. Based on the logical value b or $\bar{b}$ of the data bit one of the two symbol regions is selected. It should be noted that there exist two contiguous symbol regions each for two bits $S_b^1$ and $S_{\bar{b}}^1$. Accordingly, FIG. 10 illustrates how a second data bit of the quadruple of bits is mapped to one of two horizontally contiguous symbol regions $S_b^2$ and $S_{\bar{b}}^2$. Hence, two bits of the quadruple of bits (data word) are selecting contiguous symbol regions in the representation of the 16-CAM constellation in the complex plane.

Figure 11:
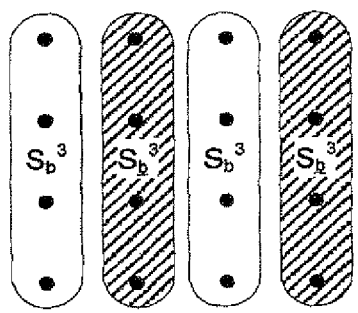
Figure 12:
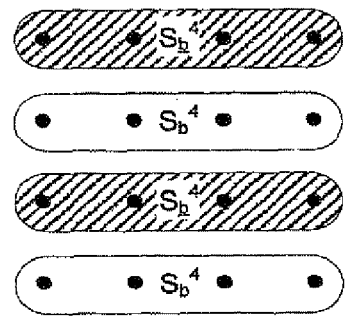
Figure 13:
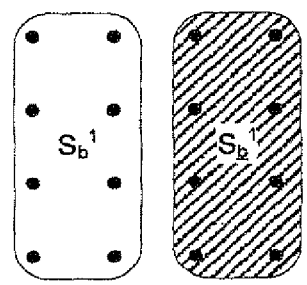
FIG. 13 to 16 show the regional mappings of the four constituent bits (data word) to their symbols in a square 16-QAM constellation using Gray mapping.
Figure 14:
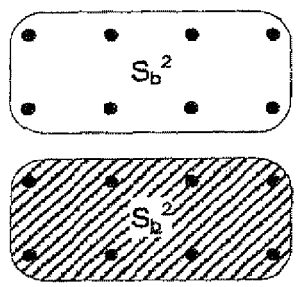
Figure 15:
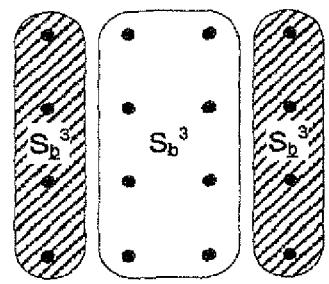
Figure 16:
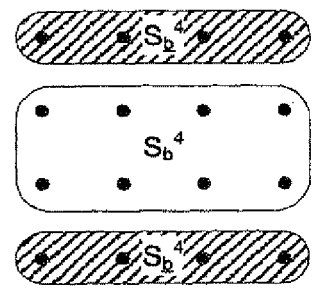

Further, FIG. 11 shows an exemplary selection of a third data bit of the quadruple of bits of one of two vertically non-contiguous symbol regions $S_b^3$ and $S_{\bar{b}}^3$ and FIG. 12 shows an exemplary selection of a data fourth bit of the quadruple of bits of one of two horizontally non-contiguous symbol regions $S_b^4$ and $S_{\bar{b}}^4$. The remaining two bits of the quadruple of bits (data word) are thus selecting non-contiguous symbol regions in the representation of the 16-CLAM constellation in the complex plane.

It should be noted that in FIG. 9 to FIG. 12 it is not required that the "first data bit" selecting one of the two contiguous symbol regions $S_b^1$ and $S_{\bar{b}}^1$ in FIG. 11 is equivalent to the most significant bit of the data word. Likewise the "second, third and fourth data bit" do not necessarily have to correspond to the second, third or fourth bit of the data word, respectively. Similarly, the exemplary selection of the symbol regions in FIG. 9 to FIG. 12 may also not be construed as to be limited to the two most significant bits of the data word selecting a respective one of the contiguous symbol regions illustrated in FIG. 9 and FIG. 10, while the two least significant bits of the data word select a respective one of the two non-contiguous symbol regions shown in FIG. 11 and FIG. 12, though this implementation is certainly possible.

To understand the difference of this proposed AICO mapping scheme to a conventional Gray mapping scheme, the equivalent corresponding symbol regions for a Gray approach are given in FIG. 13 to FIG. 16. It is recognized from FIG. 13 to FIG. 16 that for two out of the four bits of a data word there is no difference in the symbol regions between the Gray and AICO mappings. However for the two remaining bits the symbol regions are different. Depending on the logical bit value, either a modulation symbol from a contiguous or non-contiguous region is used in Gray mapping, but in AICO mapping always a modulation symbol from two non-contiguous regions is used.

In Chindapol et al., "Design, analysis, and performance evaluation for BICM-ID with square CAM constellations in Rayleigh fading channels" discussed previously, Gray and other mappings, including their respective region mappings are presented. It may be noted that the constellations presented in the article of Chindapol et. al are intended for use in an iterative decoding scheme presented in the article. It should be noted that the invention does not require an iterative structure at the receiver and therefore allows the use of simple hardware in transmitter and receiver.

As can be seen in from FIG. 9 to FIG. 12, the modulation symbols are arranged in 4 columns of four modulation symbols each, when considering a vertical separation the modulation symbols, and in four rows of modulation symbols each, when considering a horizontal separation the modulation symbols. Based on this exemplary illustration of the 16-QAM constellation shown in FIG. 9 to FIG. 12, the mapping outlined in a") to d") above may alternatively be formulated as:

a) a first one of the four data bits representing a modulation symbol selects one of two contiguous symbol regions of the 16-QAM constellation based on its logical value, each of the two contiguous symbol regions being formed by two rows adjacent to each other b) a second one of the four data bits representing the respective modulation symbol selects one of two contiguous symbol regions of the 16-QAM constellation based on its logical value, each of the two contiguous symbol regions being formed by two columns adjacent to each other c) a third one of the four data bits representing the respective modulation symbol selects one of two non-contiguous symbol regions of the 16-QAM constellation based on its logical value, each of the two non-contiguous symbol regions being formed by two rows not adjacent to each other d) a fourth one of the four data bits representing the respective modulation symbol selects one of two non-contiguous symbol regions of the 16-QAM constellation based on its logical value, each of the two non-contiguous symbol regions being formed by two columns not adjacent to each other As has been briefly explained above, a transmit diversity structure for Gray mapping e.g. in time domain (ARQ, HARQ) has benefits, if the at least second version of the 16-QAM constellation is rearranged in the signal space with respect to the first version for diversity transmission. Another main aspect of the invention is a definition of constellation rearrangement rules for use in transmit diversity scenarios with the above specified AICO mapping.

As has been mentioned earlier, each point in a 16-QAM constellation has either two, three, or four nearest neighbour points (see FIG. 4—exemplified for the symbols in the northeast quadrant by the lines connecting the symbols).

In the following, d denotes the minimum Euclidian distance between a modulation symbol in the 16-QAM constellation and one of the axes denoting the inphase and the quadrature components of the modulation symbols, as illustrated in FIG. 3. Accordingly, D denotes the squared minimum Euclidian distance, i.e. $d^2=D$. Consequently, the minimum squared Euclidian distance between two modulation symbols is $(2d)^2$ or 4D. If it is assumed that the first constellation version adheres to the definitions of AICO mapping above, the following properties with respect to the involved Hamming distances and (squared) Euclidean distances may be observed.

Figure 5:
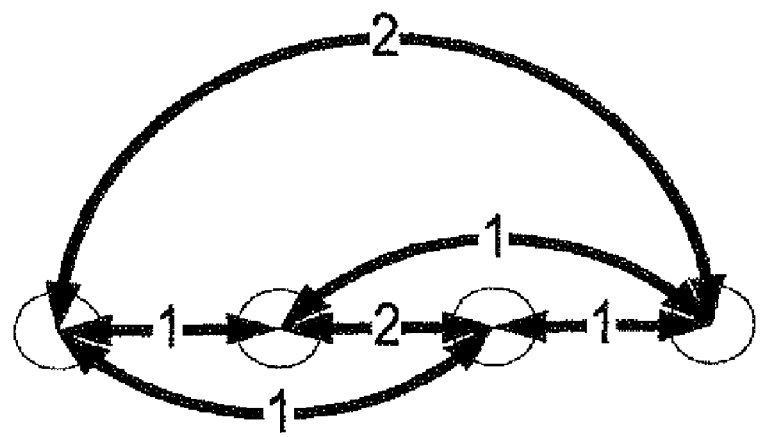
FIGS. 5 and 6 show the occurrence of Hamming and squared Euclidean distances between constellation symbols in one dimension of a 16-QAM constellation according to an embodiment of the invention.
Figure 6:
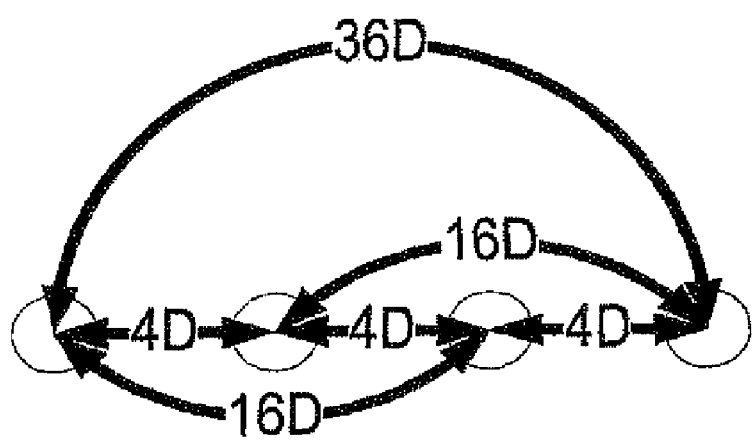

FIGS. 5 and 6 show the Hamming distances and squared Euclidean distances regarding one dimension of an AICO mapping, i.e. the Hamming distances and squared Euclidean distances of modulations symbols in each row or column of the two dimensional, complex signal space. Those skilled in the art will appreciate that this is done for simplicity. These distance properties can easily be extended to the two-dimensional 16-QAM case by adding the Hamming and squared Euclidean distances for each dimension respectively. In FIGS. 5 and 6 the variable D is used for normalisation purposes. Usually if a 16-QAM constellation is employed, the distances between symbols of the constellation are normalised so that the average power is equal to 1. Therefore, in this exemplary embodiment, D would be equal to $\frac{1}{10}$.

The table below shows the distance profiles for a single version Gray and AICO mapping (including a distance of zero for the trivial case of the distance between a symbol and itself).

| Hamming Distance | Gray Mapping: Frequency × Squared Euclidean Distance | AICO Mapping: Frequency × Squared Euclidean Distance |
|---|---|---|
| 0 | 16 × 0D | 16 × 0D |
| 1 | 48 × 4D, 16 × 36D | 32 × 4D, 32 × 16D |
| 2 | 36 × 8D, 32 × 16D, 24 × 40D, 4 × 72D | 16 × 4D, 16 × 8D, 32 × 20D, 16 × 32D, 16 × 36D |
| 3 | 48 × 20D, 16 × 52D | 16 × 8D, 16 × 20D, 16 × 40D, 16 × 52D |
| 4 | 16 × 32D | 4 × 8D, 8 × 40D, 4 × 72D |

The frequency of occurrence of the squared Euclidean distance(s) for a pair of symbols having a particular Hamming distance is counted and summed up for all symbols of the 16-QAM constellation. Therefore the case of Hamming distance zero occurs 16 times, as there are 16 distinct symbols in a 16-QAM constellation.

When employing the constellation rearrangement scheme for Gray Mapping (as introduced in the beginning of the present application) to transmit two versions, distances from both versions are combined for each pair of symbols. For example in the table above it can be recognized that two symbols with a Hamming distance of 1 may have a Squared Euclidean Distance of either 4D or 36D for Gray Mapping. Since both versions employ Gray mapping, this is true for the first and the second version, therefore a combined distance of either 8D (=4D+4D), 40D (=4D+36D=36D+4D), or 72D (=36D+36D) is possible. However closer inspection of the constellation rearrangement concept for Gray mapping reveals that only the combined distances of either 8D or 40D are possible using two versions. Overall, a combining of distances from both versions for all pairs of symbols results in the distance properties given in the table below.

| Hamming Distance | Gray Mapping Frequency × Squared Euclidean Distance |
|---|---|
| 0 | 16 × 0D |
| 1 | 32 × 8D, 32 × 40D |
| 2 | 16 × 16D, 32 × 32D, 32 × 48D, 16 × 80D |
| 3 | 32 × 40D, 32 × 72D |
| 4 | 16 × 64D |

From the table above it can be recognized that after using the constellation rearrangement scheme for Gray mapping there is no unambiguous distribution of the distances, since for a given Hamming Distance there may be several resulting Squared Euclidean Distances. However when using AICO mapping, as will be illustrated below, an unambiguous distribution of the distances is possible when combining two versions of AICO constellations using the following set of constellation rearrangement rules:

1. A modulation symbol of the 16-QAM constellation that has two nearest neighbors in the first version is rearranged such that it has four nearest neighbors in the second version
2. A modulation symbol of the 16-QAM constellation that has three nearest neighbors in the first version is rearranged such that it has three nearest neighbors in the second version
3. A modulation symbol of the 16-QAM constellation that has four nearest neighbors in the first version is rearranged such that it has two nearest neighbors in the second version These rearrangement rules may alternatively be defined as follows:

1. Two modulation symbols that have a Hamming distance of 1
   a) and a squared Euclidean distance of 4D in the first version have a squared Euclidean distance of 16D in the second version
   b) and a squared Euclidean distance of 16D in the first version have a squared Euclidean distance of 4D in the second version
2. Two modulation symbols that have a Hamming distance of 2
   a) and a squared Euclidean distance of 4D in the first version have a squared Euclidean distance of 36D in the second version
   b) and a squared Euclidean distance of 36D in the first version have a squared Euclidean distance of 4D in the second version
   c) and a squared Euclidean distance of 8D in the first version have a squared Euclidean distance of 32D in the second version
   d) and a squared Euclidean distance of 32D in the first version have a squared Euclidean distance of 8D in the second version
   e) and a squared Euclidean distance of 20D In the first version have a squared Euclidean distance of 20D in the second version
3. Two modulation symbols that have a Hamming distance of 3
   a) and a squared Euclidean distance of 8D in the first version have a squared Euclidean distance of 52D in the second version
   b) and a squared Euclidean distance of 52D in the first version have a squared Euclidean distance of 8D in the second version
   c) and a squared Euclidean distance of 20D in the first version have a squared Euclidean distance of 40D in the second version
   d) and a squared Euclidean distance of 40D in the first version have a squared Euclidean distance of 20D in the second version
4. Two modulation symbols that have a Hamming distance of 4
   a) and a squared Euclidean distance of 8D in the first version have a squared Euclidean distance of 72D in the second version
   b) and a squared Euclidean distance of 72D in the first version have a squared Euclidean distance of 8D in the second version
   c) and a squared Euclidean distance of 40D in the first version have a squared Euclidean distance of 40D in the second version In this document, two versions of AICO (or Gray) mappings that relate to each other according to the above rules will be referred to as AICO (or Gray) diversity arrangement mappings or versions. The graphical representation of how the symbols are rearranged according to the above rules in the diversity arrangement versions will be referred to as "rearrangement patterns".

Figure 17:
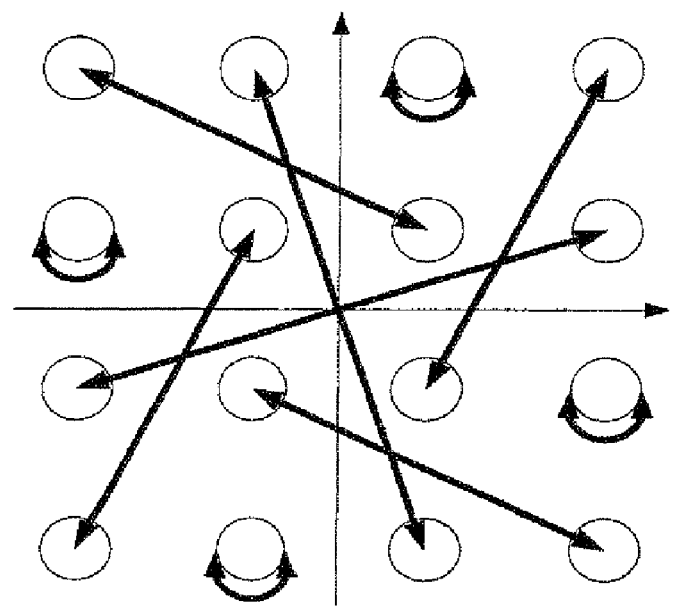
FIG. 17 shows an exemplary rearrangement relation between 16-QAM constellation symbols in a first and second version using a bidirectional rearrangement pattern according to one embodiment of the invention.
Figure 18:
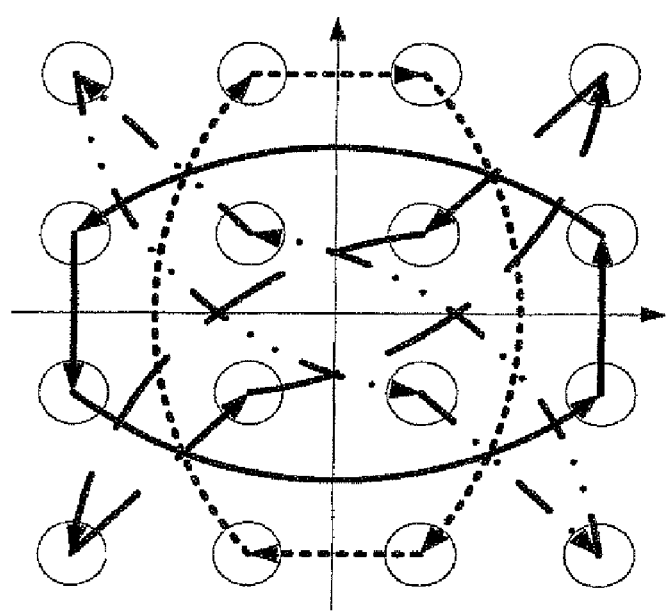
FIG. 18 shows the rearrangement relation between 16-QAM constellation symbols in a first and second version using a unidirectional rearrangement pattern according to another embodiment of the invention.

An exemplary rearrangement pattern proposed according to an embodiment of the invention may be such that two signal points exchange their positions between first and second version, as for example shown in FIG. 17. It should be noted that in FIG. 17 four modulation symbols keep their positions in the rearranged constellation, i.e. exchange their positions with themselves. Alternatively, in another embodiment of the invention, the rearrangement pattern may be directional as shown in FIG. 18.

When using two diversity arrangement versions of AICO 16-CLAM constellations for the first and the second transmission adhering to the rearrangement rules defined above, it can be noted that due to the antipodal property of the constellations, the rearrangement patterns are symmetric to the origin.

Figure 7:
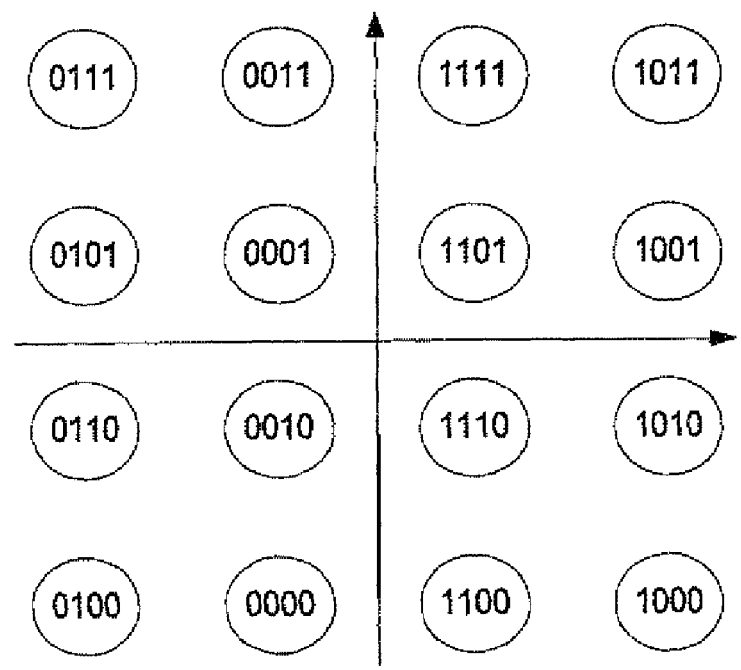
FIGS. 7 and 8 show two examples of mapping the words onto constellation points employing the AICO mapping principle according to an exemplary embodiment of the invention.
Figure 8:
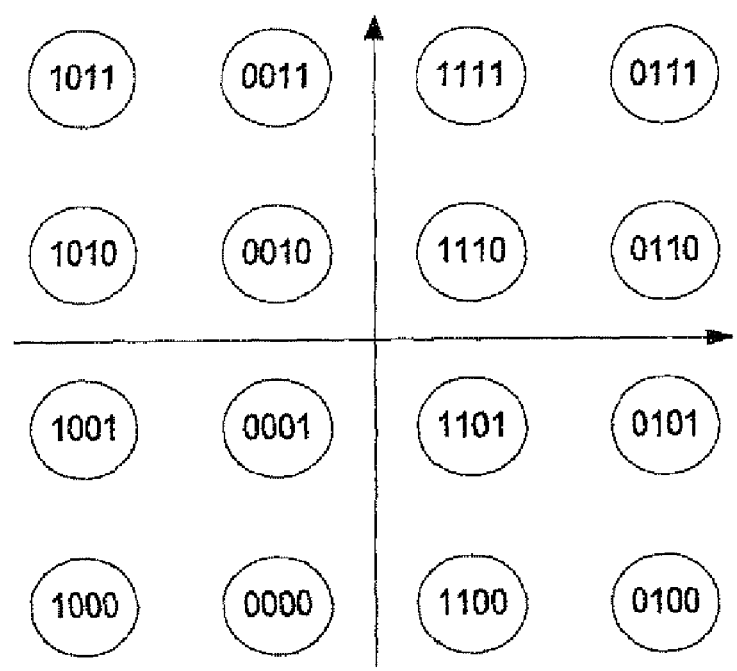
Figure 19:
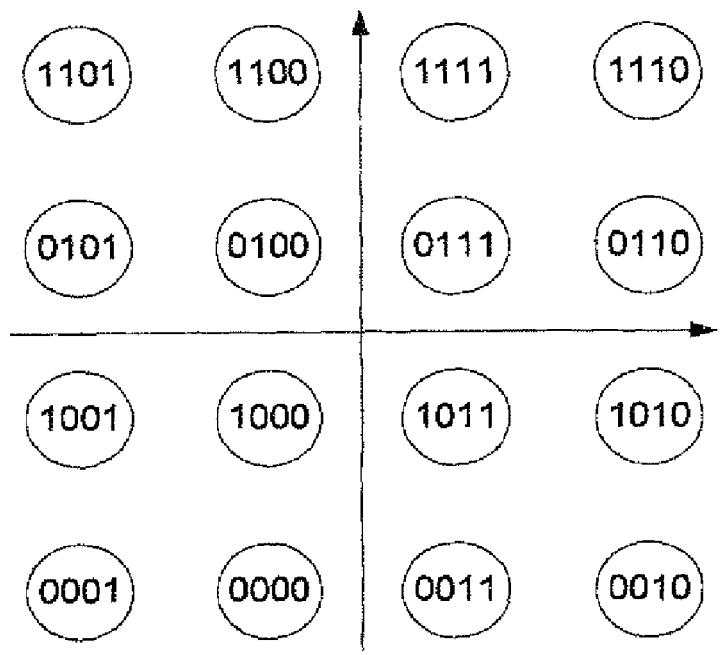
FIG. 19 shows an example of a 16-QAM constellation with AICO mapping having been rearranged according to a rearrangement pattern according to an embodiment of the invention given in FIG. 17 and being a rearranged version of the 16-QAM constellation with AICO mapping shown in FIG. 7.
Figure 20:
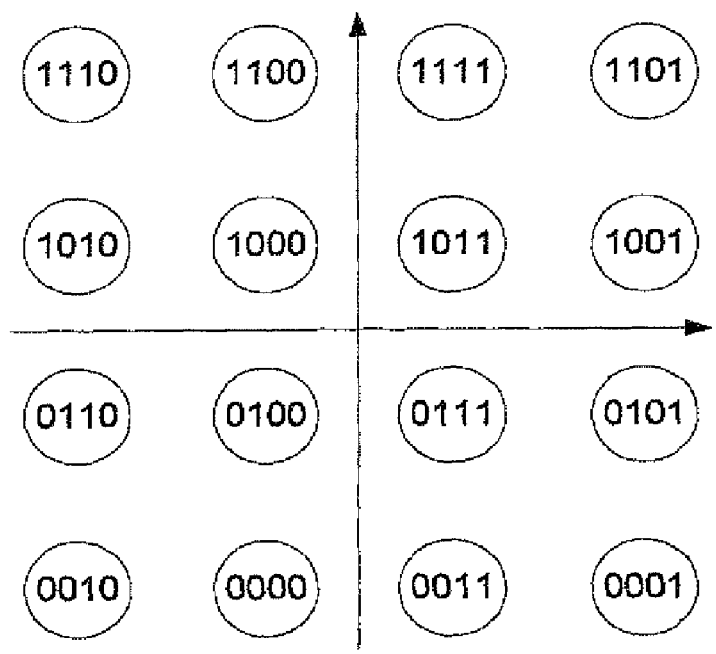
FIG. 20 shows an example of a 16-QAM constellation with AICO mapping having been rearranged according to a rearrangement pattern according to an embodiment of the invention given in FIG. 17 and being a rearranged version of the 16-QAM constellation with AICO mapping shown in FIG. 8.

Examples for rearranged constellation versions of the AICO mappings according to the rules defined above are shown in FIG. 19 and FIG. 20, which illustrate a rearranged version of the AICO constellations shown in FIG. 7 and FIG. 8 respectively. Therefore FIG. 7 and FIG. 19 represent two diversity arrangement versions, as well as FIG. 8 and FIG. 20.

From the set of rearrangement rules above, eight different possible rearrangement patterns have been found by computer-aided search. These patterns are given in FIG. 23 to FIG. 30. It may be noted that FIGS. 17 and 18 are equivalent to the FIGS. 28 and 27 respectively. In FIG. 23 to FIG. 30 the arrows indicate which data word corresponding to a symbol in the first version of the AICO 16-QAM constellation is identifying which symbol of the AICO 16-QAM constellation in the second, rearranged version. Each of these eight exemplary solutions fulfils the requirements on the rearrangement properties defined above. From a performance point of view, these eight solutions are therefore equivalent.

The result of combining the distances of two diversity arrangement versions for two Gray versions and for two AICO versions are summarised in the table below.

| Hamming Distance | Gray Mapping Frequency × Squared Euclidean Distance | AICO Mapping Frequency × Squared Euclidean Distance |
| --- | --- | --- |
| 0 | 16 × 0D | 16 × 0D |
| 1 | 32 × 8D, 32 × 40D | 64 × 20D |
| 2 | 16 × 16D, 32 × 32D, 32 × 48D, 16 × 80D | 96 × 40D |
| 3 | 32 × 40D, 32 × 72D | 64 × 60D |
| 4 | 16 × 64D | 16 × 80D |

The table above illustrates the frequency of occurrence of the squared Euclidean distance(s) for a pair of symbols having a particular Hamming distance in the first and second constellation versions, counted and summed up for all points of the 16-QAM constellation.

Figure 21:
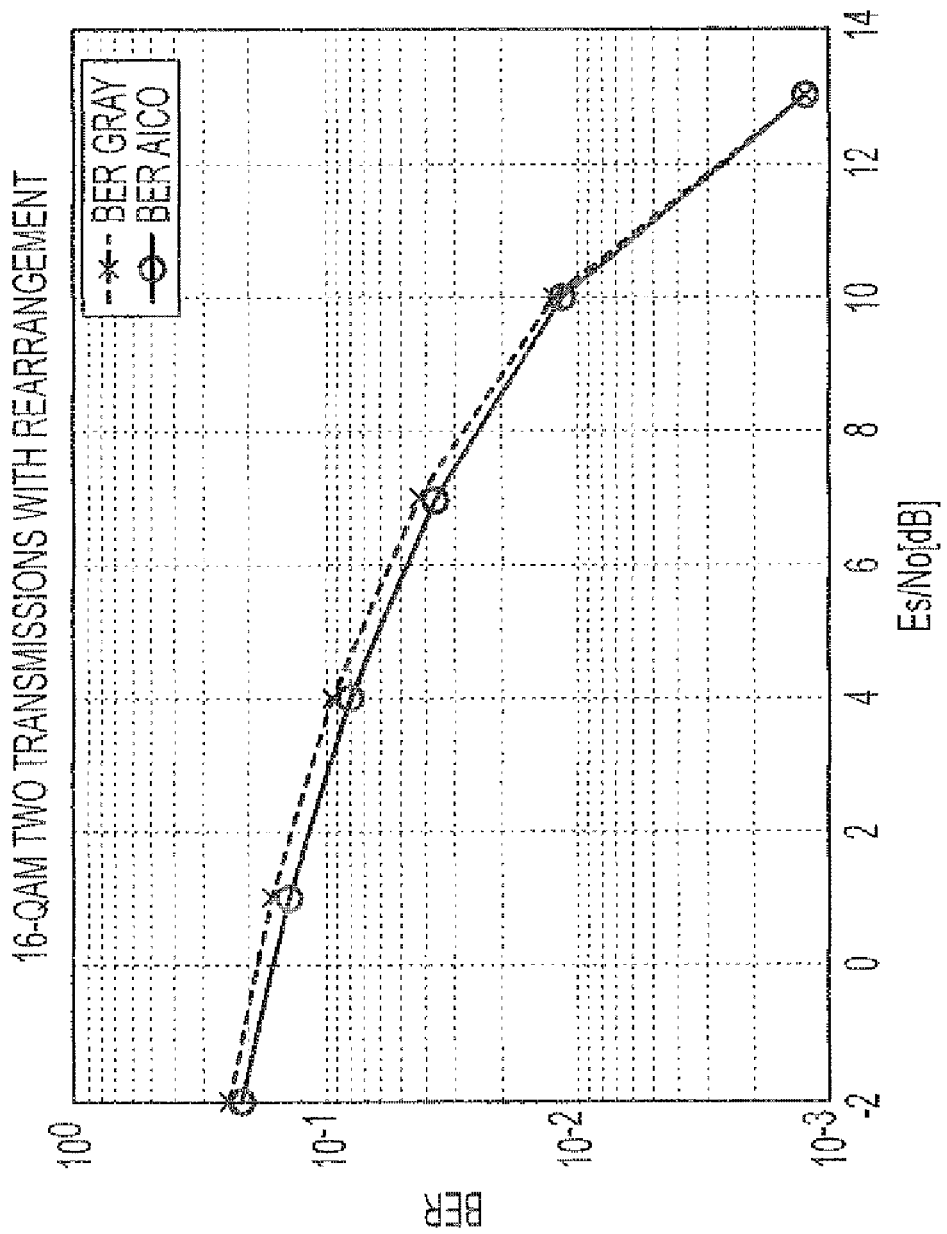
FIG. 21 shows the Monte Carlo simulation result in AWGN for Gray and AICO 16-QAM mapping for an encoded transmission using one original and one rearranged mapping version.

The merit of the proposed structure has been proven by numerical Monte Carlo simulations. The simulation result shown in FIG. 21 illustrates a comparison of the bit-error rate performance for an uncoded signal in and AWGN environment using Gray mapping and AICO mapping when employing two transmission of a data word with different constellations, respectively. The results shown in this figure has been obtained by a very simple single-stage LLR-calculator for each bit of a modulation symbol, and subsequent combining of the LLRs for the corresponding bits in diversity transmission/reception, followed by a hard decision depending on the sign of the resultant combined LLR.

Figure 22:
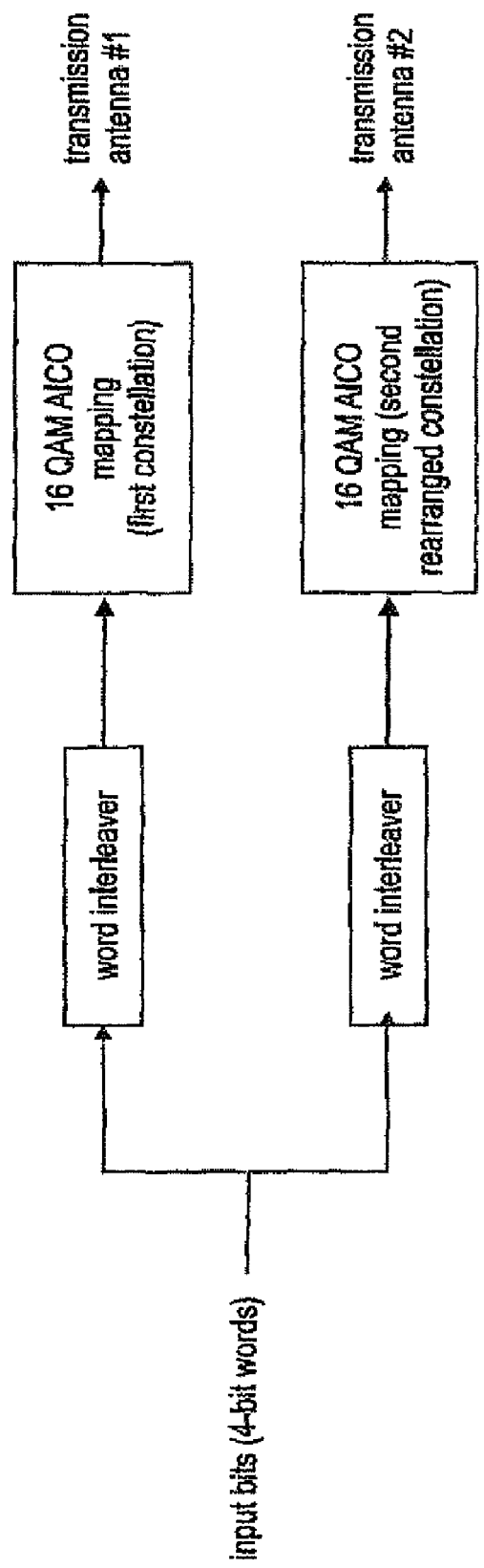
FIG. 22 shows an exemplary block diagram of a transmission apparatus structure for transmission antenna diversity employing two branches according to an embodiment of the invention.
Figure 23:
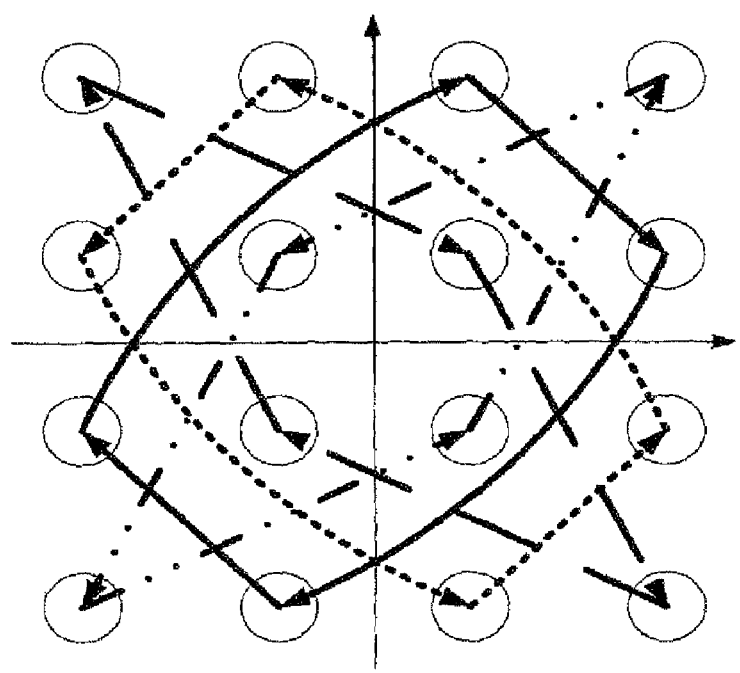
FIG. 23 to 30 show the eight rearrangement relations fulfilling the specified rearrangement rules according to an embodiment of the invention.
Figure 24:
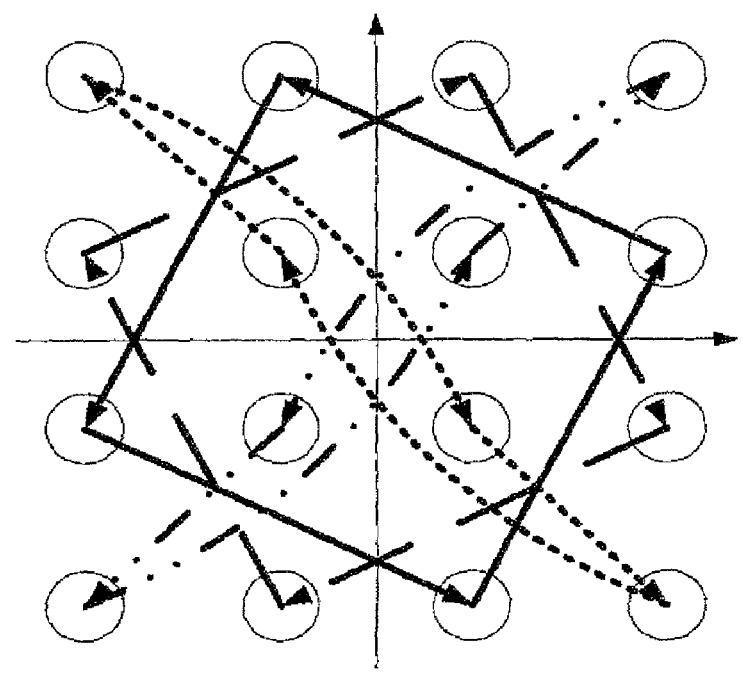
Figure 25:
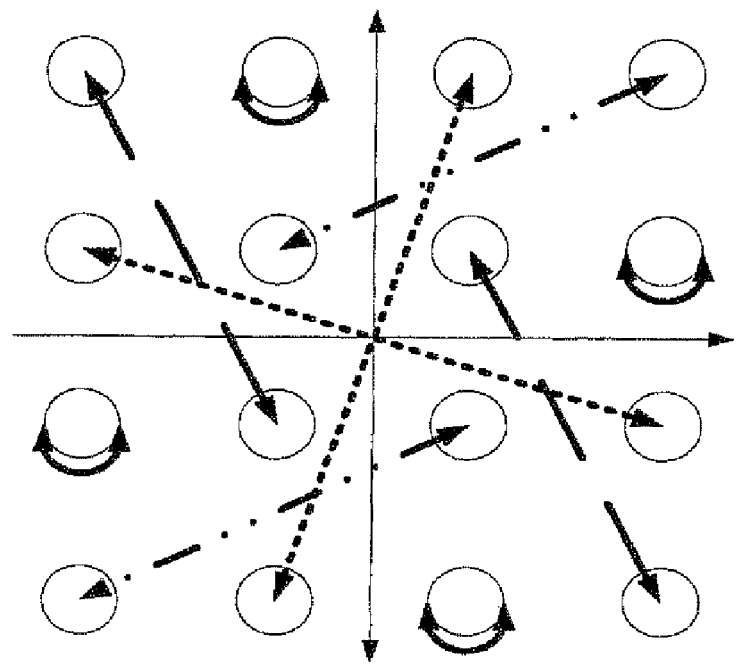
Figure 26:
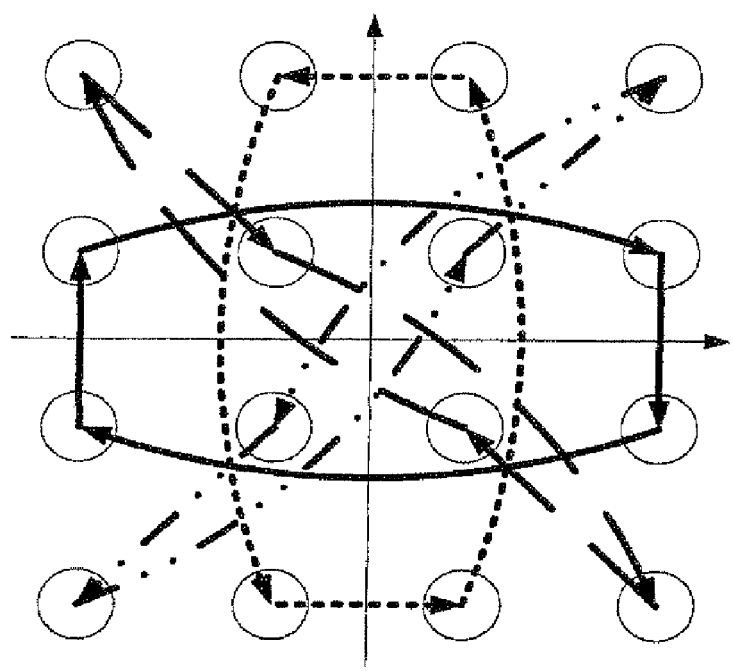
Figure 27:
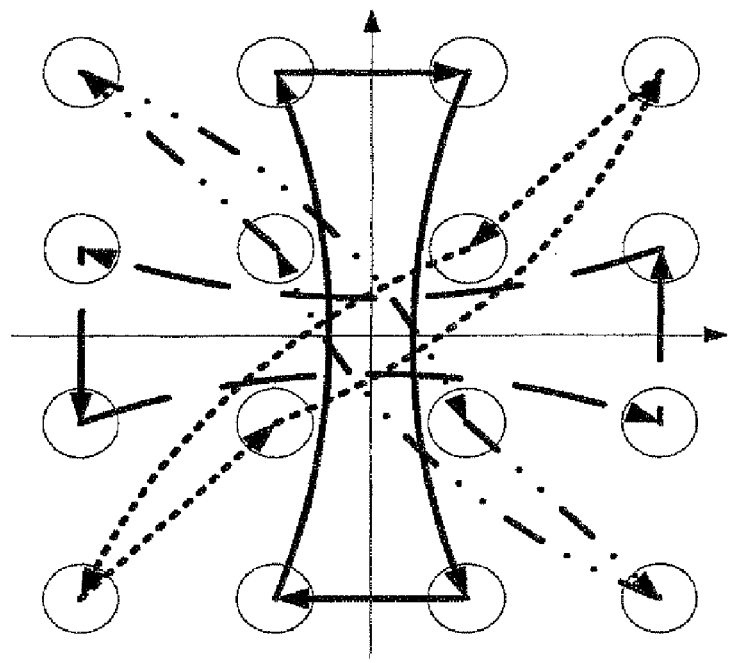
Figure 28:
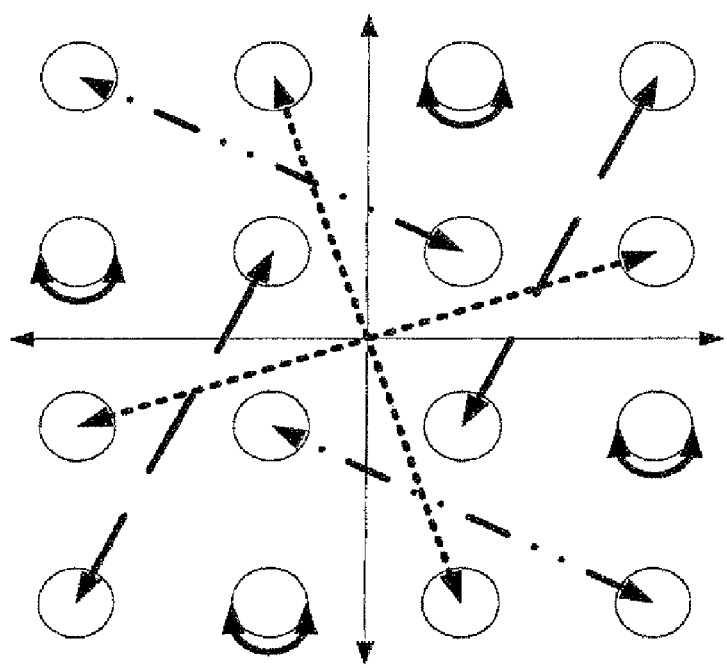
Figure 29:
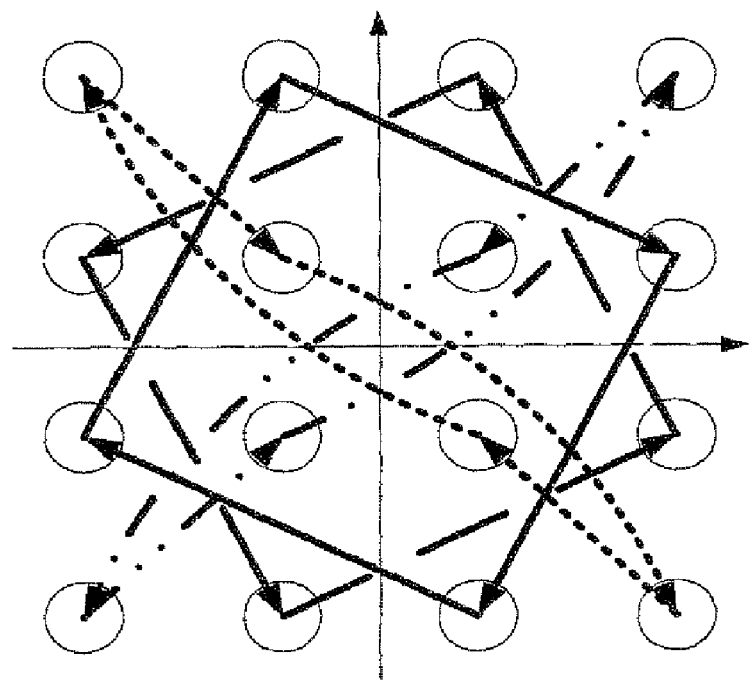
Figure 30:
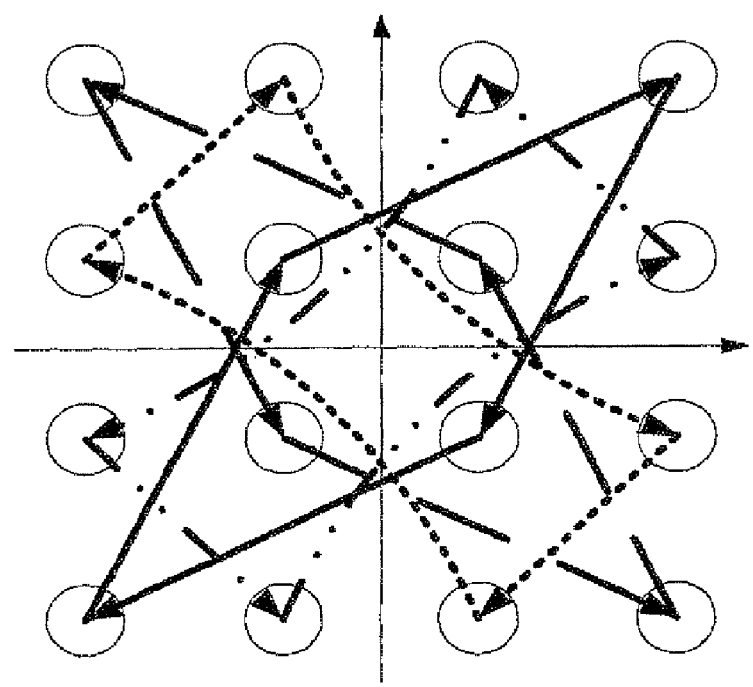

FIG. 22 shows a simplified block diagram of a transmitting apparatus according to an embodiment of the invention using transmit antenna diversity together with the AICO constellation rearrangement scheme proposed above. Each 4-bit word is used as input to two distinct diversity branches, which may (optionally) employ independent word interleaving over a block of several 4-bit words. Subsequently they are mapped onto complex symbols employing two different AICO mappings, which show a relation as outlined in the previous sections. Each of these signals is then forwarded to the transmit antenna structures.

It is to be noted that the invention may be employed with any type of diversity scheme. Another exemplary transmitter structure and receiver structure according to embodiments of the invention will be described in the following in more detail.

Figure 31:
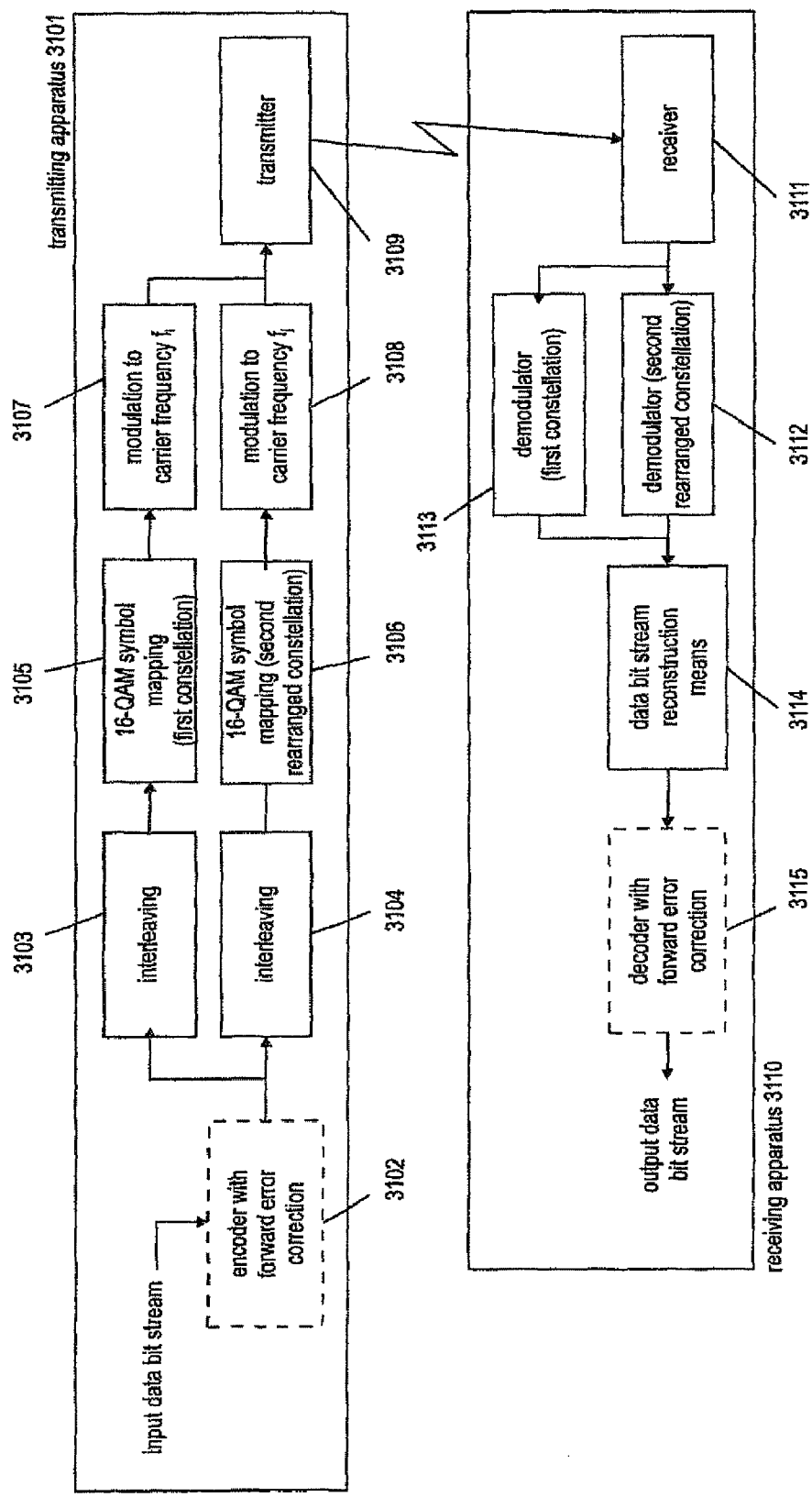
FIG. 31 shows an exemplary transmitter and receiver block diagram according to another embodiment of the invention.

FIG. 31 shows a transmitting apparatus 3101 and a receiving apparatus 3110 according to one embodiment of the invention. In the transmitting apparatus 3101, an input data stream is provided from a higher layer. The input data stream may for example be voice from an ongoing voice communication or any type of data communication. Optionally, the input data stream may be encoded in an encoder 3102 employing forward error correction. For example, the encoder 3102 may be a convolutional encoder, a turbo encoder, or block encoder.

Optionally, the input data stream may be split into two diversity branches prior to being provided to interleavers 3103 and 3104 which interleave the respective streams independent from each other or employing the same interleaving scheme. The interleavers 3103 and 3104 output to a 16-QAM mapping means 3105 and 3106 respectively, in which the data bits of the streams are mapped to one of the 16 modulation symbols in units of four bits (quadruples). As explained above, the 16-QAM mapping means 3105 and 3106 use a first and a second, rearranged AICO 16-QAM constellation (diversity arrangement mappings) as described above, where the second constellation version is a rearranged version of the first constellation version adhering to the rearrangement rules described previously herein.

For exemplary purposes, a frequency diversity scheme is employed in the embodiment of the invention shown in FIG. 31. Therefore, the sections 3107 and 3108 map the modulation symbols output by 16-QAM mapping means 3105 and 3106 to distinct carrier frequencies $f_i$ and $f_j$, respectively. The modulated signal is provided to a transmitter 3109 which transmits the signals to the receiving apparatus 3110.

In another embodiment of the invention, more than two versions may be employed for the transmit diversity. For example, the data may be transmitted using three versions, where the first version and the second version are AICO diversity arrangement mappings, and the third version does not have a special relation to the first or second versions used. A fourth version may then form together with the third versions two new AICO diversity arrangement versions. However the relation (i.e. the rearrangement pattern) between third and fourth version may be different from the relation between first and second version.

For example, the rearrangement pattern between first and second version may be bidirectional, but the rearrangement pattern between third and fourth version may be unidirectional. Even if both patterns show the same "directionality", they may differ in their details.

Example distance statistics for a diversity transmission employing four Gray constellation mappings and four AICO constellation versions as described above are shown in the table below.

| Hamming Distance | Gray Mapping Frequency × Squared Euclidean Distance | AICO Mapping Frequency × Squared Euclidean Distance |
|---|---|---|
| 0 | 16 × 0D | 16 × 0D |
| 1 | 64 × 48D | 64 × 40D |
| 2 | 32 × 64D, 64 × 96D | 96 × 80D |
| 3 | 64 × 112D | 64 × 120D |
| 4 | 16 × 128D | 16 × 160D |

In the different distance property tables illustrated in this document, the frequencies of how often certain squared Euclidean distances occur for different Hamming distances between two modulation symbols have been listed. For those, the differences of all signal points to all signal points are evaluated. Consequently there exist a total of 16×16=256 distance values, which is obtained also by summing all listed frequencies. Since Hamming distance and squared Euclidean distance between a point and itself are both 0, and having a total of 16 distinct modulation symbols within the constellation, the value Euclidean distance and Hamming distance of 0 is obtained exactly 16 times. Similarly the sum of frequencies is always 64 for a Hamming distance of 1, is always 96 for a Hamming distance of 2, is always 96 for a Hamming distance of 3, and is always 16 for a Hamming distance of 4.

Figure 1:
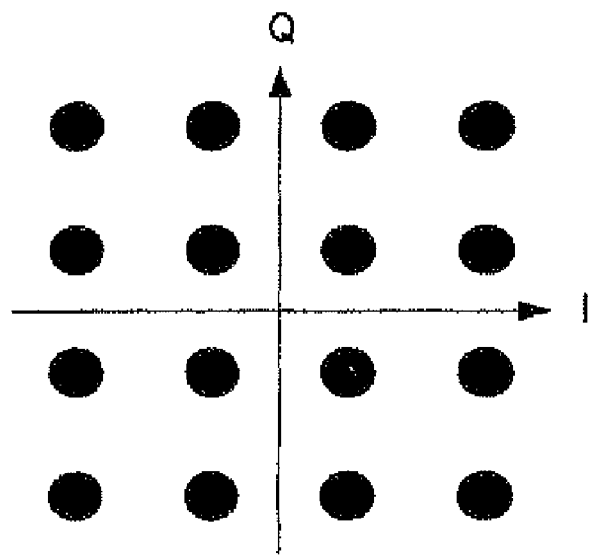
FIGS. 1 and 2 show two 16-QAM symbol constellations with a square mapping.
Figure 2:
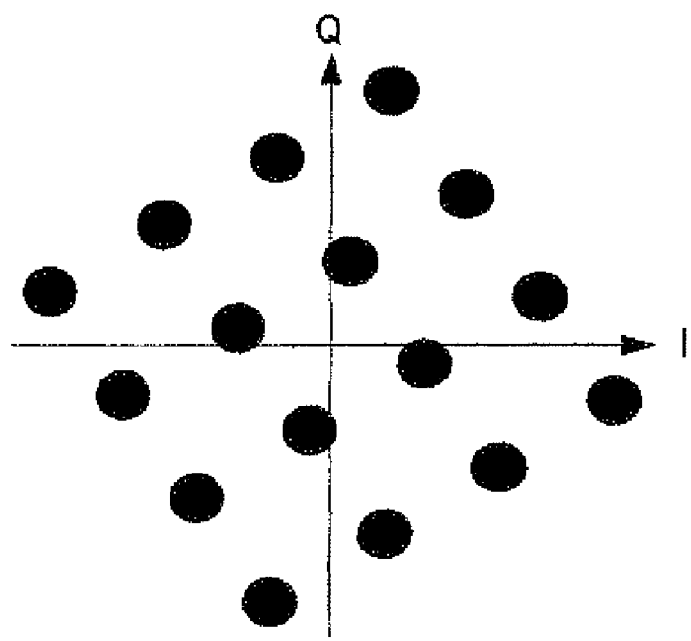

It should be apparent to those skilled in the art that the description so far referred to real and imaginary axes of AICO mapping for a representation of a 16-QAM constellation as in shown in FIG. 1. In case of considering a rotated constellation as for example shown in FIG. 2, the orthogonal axes would have to be likewise rotated, in particular the terms "rows" and "columns" as they have been used so far would have to be interpreted as rotated "rows" and "columns" respectively.

Returning now to FIG. 31, receiving apparatus structure will now be described in further detail. According to one embodiment of the invention, the receiver 3111 of the receiving apparatus 3110 receives the signals transmitted by the transmitting apparatus 3101 at frequencies $f_i$ and $f_j$ respectively. The received signals are output to demodulators 3112 and 3113 respectively, which detect the individual modulation symbols in the respective signal. In other words, the demodulators associate the different diversity branches transmitted at distinct frequencies according to the first 16-QAM constellation and second rearranged 16-QAM constellation used by the transmitting apparatus 3101. Obviously, the receiving apparatus 3110 needs to be made aware of or is aware of the symbol mappings used by the transmitting apparatus in order to be able to reverse the mapping of modulation bits to data words (bit quadruples).

The demodulators 3112 and 3113 also associate each bit of the data words with a metric allowing reconstructing the logical value of the individual data bits of the received data words. The content of this metric for each data bit in the data words depends on the decoding strategy used, as will be elaborated on further down below. The demodulators 3112 and 3113 may be further aware of or may be made aware of the interleaving scheme used by the interleavers 3103 and 3104 at the transmitting apparatus 3101 (e.g. by predefining the interleaving pattern(s) or by means of control signaling).

The data words, the metrics of the individual data bits as is provided to the data bit stream reconstruction means 3114, which combines the data bit pairs from the two diversity branches based on the metrics associated to the individual bits of the two diversity branches.

If the input data bit stream has been encoded on the transmission side, the receiving apparatus 3110 further comprises a decoder 3115 to decode the data stream provided by the data bit stream reconstruction means 3114.

It should be noted that the structure of the individual components of the receiving apparatus 3110 will depend on the demodulation/decoding scheme employed at the individual receiving apparatus 3110. Important for the correct reconstruction of the original input data bit stream transmitted by the transmitting apparatus is that the receiving apparatus 3110 is able to provide a reverse mapping of the modulation symbols to data words, to associate the data bits or each of the data words of the different diversity branches.

Depending on the receiver apparatus strategy, the metrics associated to the individual bits in the data words may have different contents of the metric. For example, if the decoding is performed using soft-values, the metric may indicate a probability value or probability values indicating the probability of whether an individual data bit has a logical value of −1 or 1. For this purpose, the metric may be for example a log likelihood ratio (LLR) which is defined by $$LLR(x_i) = \log \frac{p(x_i = 1)}{p(x_i = 0)},$$

wherein $p(x_i=1)$ is the probability that the bit $x_i$ is equal to the logical value of 1 and $p(x_i=0)$ is the probability that the bit $x_i$ is equal to the logical value of −1. Thus, the sign of the LLR directly indicates the logical value of the bit $x_i$ and the absolute value of the LLR indicates the certainty of the decision. When working with LLRs at a receiving apparatus, the reconstructed data bit may be reconstructed from a data bit pair (data bit and its repetition according to the two diversity branches)—for example—by simply adding the of the data bits of the data bit pair, and the logical value of the reconstructed data bit may be decided based on the sign of the sum of the LLRs.

Figure 32:
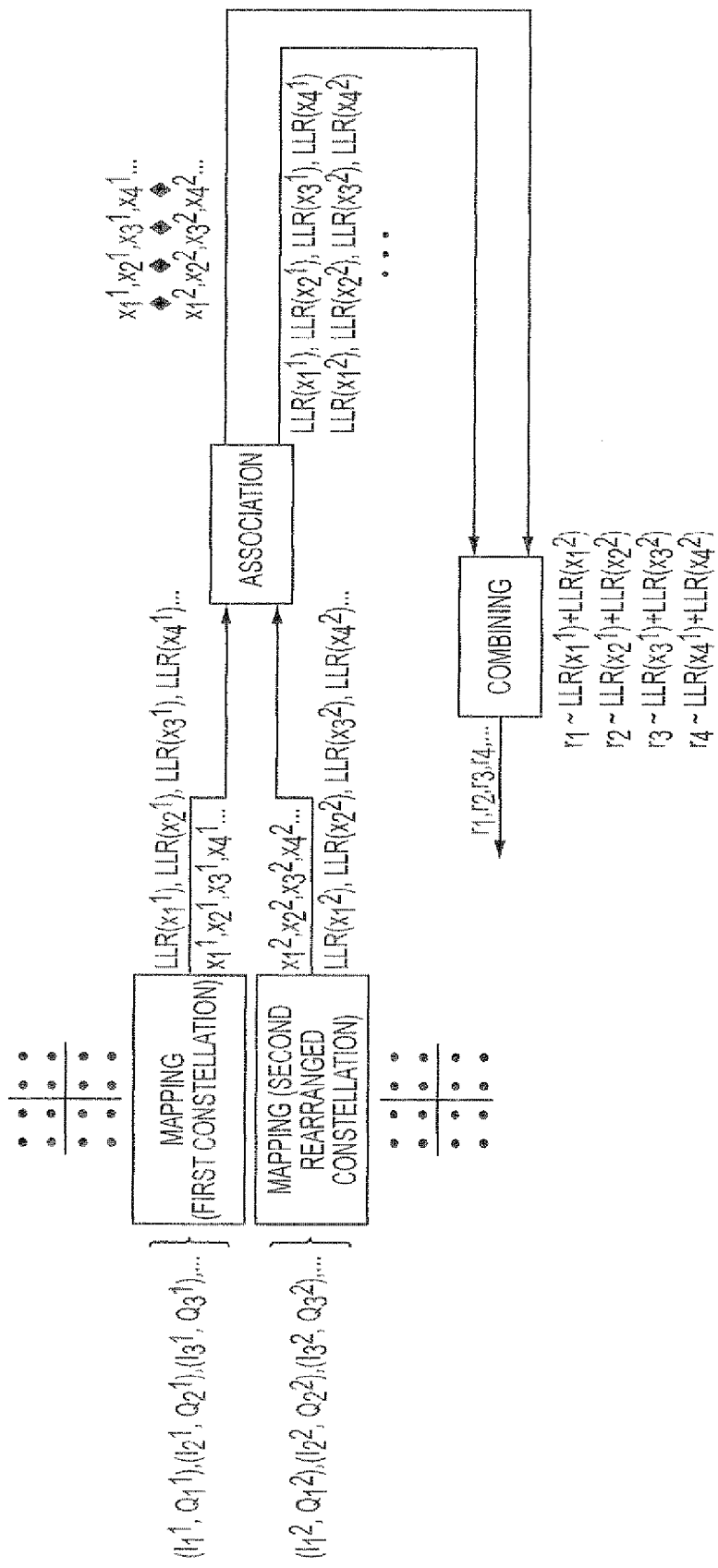
FIG. 32 shows an exemplary demodulation and data stream reconstruction process according to an embodiment of the invention.

FIG. 32 illustrates the reconstruction of the data bit streams $r'_1, r'_2, r'_3, r'_4, \ldots$ and $r''_1, r''_2, r''_3, r''_4, \ldots$ from the received signals at frequencies $f_i$ and $f_j$. The streams may be represented by their inphase and quadrature components $I_i$ and $Q_i$ and $I_j$ and $Q_j$ measured for the symbol $(I_i, Q_i)$ and $(I_j, Q_j)$ respectively. Each of the symbols $(I_i, Q_i)$ and $(I_j, Q_j)$ is mapped to a quadruple of bits $x_1^i, x_2^i, x_3^i, x_4^i$ or $x_1^j, x_2^j, x_3^j, x_4^j$ respectively using the first version of the AICO 16-QAM constellation and its rearranged second version indicating the corresponding quadruple of bits for each symbol $(I_i, Q_i)$ and $(I_j, Q_j)$. Based on the actual values of the symbol components $(I_i, Q_i)$ and $(I_j, Q_j)$ and the resulting (squared Euclidian) distance(s) to modulation symbols in the 16-QAM constellation, each of the bits $x_1^i, x_2^i, x_3^i, x_4^i$ and $x_1^j, x_2^j, x_3^j, x_4^j$ can be associated with a LLR—LLR($x_1^i$), LLR ($x_2^i$), LLR ($x_3^i$), LLR ($x_4^i$) and LLR ($x_1^j$), LLR ($x_2^j$), LLR ($x_3^j$), LLR ($x_4^j$)—that indicates the certainty of the respective bit being equivalent to the logical value of −1 or 1. Next the bit streams formed by successive quadruples $x_1^i, x_2^i, x_3^i, x_4^i$ and $x_1^j, x_2^j, x_3^j, x_4^j$ may be de-interleaved and the data bits in the streams belonging together are detected. Next, the reconstructed data bit stream $r_1, r_2, r_3, r_4$ may be built by combining the LLRs of the associated data bits (bit pairs).

When working with hard decisions at the receiving apparatus 3110 the metric may directly indicate the logical value of the respective data bit. Also in this case the combination of data bit pairs for reconstructing the (transmitted) data bit stream may simply add the metrics of the data bits of the bit pair. Also a combination with the use of soft decisions may be possible, i.e. before summing the logical values of the data bits of the data bit pair, same may be weighted using a probability value indicating the certainty in detecting the respective logical value.

Another embodiment of the present invention relates to the implementation of the above described various embodiments using hardware and software. It is recognized that the various above mentioned methods as well as the various logical blocks, modules, or circuits described above may be implemented or performed using computing devices, as for example general purpose processors, digital signal processors (DSP), application specific integrated circuits (ASIC), field programmable gate arrays (FPGA) or other programmable logic devices, etc. The various embodiments of the present invention may also be performed or embodied by a combination of these devices.

Further, the various embodiments of the present invention may also be implemented by means of software modules which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The invention claimed is:

1. A method for transmitting a data bit stream using a first 16-QAM constellation and a second 16-QAM constellation, the method comprising the steps of:
    forming a sequence of data words from the bit stream, each data word comprising four bits,
    mapping each data word to a modulation symbol using the first 16-QAM constellation to generate a first arrangement pattern of modulation symbols,
    mapping each data word to a modulation symbol using the second 16-QAM constellation to generate a second arrangement pattern of modulation symbols, and
    transmitting the first arrangement pattern of modulation symbols and the second arrangement pattern of modulation symbols according to a transmit diversity scheme,
    wherein the second arrangement pattern of modulation symbols is obtained by rearranging the first arrangement pattern of modulation symbols according to the rearrangement rules of FIG. 24:
    wherein the differently dashed arrows indicate the rearrangement of a data word corresponding to a modulation symbol in the first 16-QAM constellation and the same data word corresponding to a modulation symbol in the second, rearranged 16-QAM constellation, wherein the modulation symbol in the first 16-QAM constellation is indicated by the start of an arrow line and the modulation symbol in the second, rearranged 16-QAM constellation is indicated by the end of the arrowhead of the same arrow, and
    wherein each of the first 16-QAM constellation and the second 16-QAM constellation has 16 modulation symbols representable in four rows and four columns in a complex coordinate plane, and each modulation symbol of the first and second 16-QAM constellations represents a combination of four bits,
    wherein each of the first 16-QAM constellation and the second 16-QAM constellation obeys the following mapping rules:
        a first one of the four bits representing the modulation symbol selects one of two contiguous symbol regions of the 16-QAM constellation based on its logical value, each of the two contiguous symbol regions comprising two columns adjacent to each other,
        a second one of the four bits representing the respective modulation symbol selects one of two contiguous symbol regions of the 16-QAM constellation based on its logical value, each of the two contiguous symbol regions comprising two rows adjacent to each other,
        a third one of the four bits representing the respective modulation symbol selects one of two non-contiguous symbol regions of the 16-QAM constellation based on its logical value, each of the two non-contiguous symbol regions comprising two columns not adjacent to each other, and
        a fourth one of the four bits representing the respective modulation symbol selects one of two non-contiguous symbol regions of the 16-QAM constellation based on its logical value, each of the two non-contiguous symbol regions comprising two rows not adjacent to each other.

2. The method according to claim 1, wherein each of the first 16-QAM constellation and the second 16-QAM constellation has 16 modulation symbols representable in four rows and four columns in a complex coordinate plane, and each modulation symbol of the first and second 16-QAM constellations represents a combination of four bits,
    wherein the modulation symbols $a_{i,j}$ in the first 16-QAM constellation and the modulation symbols $b_{i,j}$ of the second 16-QAM constellation are identified by
        a column index $i \in \{0, 1, 2, 3\}$ indicating the column out of the four columns inl which the modulation symbol is located from left to right and
        a row index $j \in \{0, 1, 2, 3\}$ indicating the row out of the four rows in which the modulation symbol is located from top to bottom, and
    wherein the modulation symbols $a_{i,j}$ in the first 16-QAM constellation are rearranged to modulation symbols $b_{i,j}$ of the second 16-QAM constellation as follows:

$a_{0,0} \to b_{2,2}$, $a_{0,1} \to b_{2,0}$, $a_{0,2} \to b_{2,3}$, $a_{0,3} \to b_{2,1}$
    $a_{1,0} \to b_{0,2}$, $a_{1,1} \to b_{0,0}$, $a_{1,2} \to b_{0,3}$, $a_{1,3} \to b_{0,1}$
    $a_{2,0} \to b_{3,2}$, $a_{2,1} \to b_{3,0}$, $a_{2,2} \to b_{3,3}$, $a_{2,3} \to b_{3,1}$
    $a_{3,0} \to b_{1,2}$, $a_{3,1} \to b_{1,0}$, $a_{3,2} \to b_{1,2}$, $a_{3,3} \to b_{1,1}$.

3. The method according to claim 1, wherein each of the first 16-QAM constellation and the second 16-QAM constellation has 16 modulation symbols representable in four rows and four columns in a complex coordinate plane, and each modulation symbol of the first and second 16-QAM constellations represents a combination of four bits,
    wherein the modulation symbols $a_{i,j}$ in the first 16-QAM constellation and the modulation symbols $b_{i,j}$ the second 16-QAM constellation is identified by
        a column index $i \in \{0, 1, 2, 3\}$ indicating the column out of the four columns in which the modulation symbol is located from left to right and
        a row index $j \in \{0, 1, 2, 3\}$ indicating the row out of the four rows in which the modulation symbol is located from top to bottom, and wherein the modulation symbols $a_{i,j}$ in the first 16-QAM constellation are rearranged to modulation symbols $b_{i',j'}$ of the second 16-QAM constellation as follows:

$$a_{i,j} \to b_{i',j'}$$

wherein
i→i'
0→2
1→0
2→3
3→1
and
j→j'
0→2
1→0
2→3
3→1.

4. A method for receiving a data bit stream using a first 16-QAM constellation and a second 16-QAM constellation, the method comprising the steps of:
  receiving a transmission signal comprising data words of the data bit stream having been transmitted using the first 16-QAM constellation,
  receiving a transmission signal comprising said data words having been transmitted using the second 16-QAM constellation,
  demodulating the transmission signal by detecting modulation symbols represented by data words of four data bits using the first 16-QAM constellation and the second 16-QAM constellation respectively, thereby associating each data bit of a received modulation symbol with a metric indicating the probability of the logical value of the respective bit of the received modulation symbol or indicating the logical value of the respective bit of the received modulation symbol,
  combining each data bit having been mapped to the first 16-QAM constellation with its associated data bit having been mapped to the second 16-QAM constellation, wherein the association of data bits within the received modulation symbols is based on the association rules of FIG. 24:
  wherein the differently dashed arrows indicate the rearrangement of a data word corresponding to a modulation symbol in the first 16-QAM constellation and the same data word corresponding to a modulation symbol in the second, rearranged 16-QAM constellation, wherein the modulation symbol in the first 16-QAM constellation is indicated by the start of an arrow line and the modulation symbol in the second, rearranged 16-QAM constellation is indicated by the end of the arrowhead of the same arrow, and
  wherein each of the first 16-QAM constellation and the second 16-QAM constellation has 16 modulation symbols representable in four rows and four columns in a complex coordinate plane, and each modulation symbol of the first and second 16-QAM constellations represents a combination of four bits,
  wherein each of the first 16-QAM constellation and the second 16-QAM constellation obeys the following mapping rules:
    a first one of the four bits representing the modulation symbol selects one of two contiguous symbol regions of the 16-QAM constellation based on its logical value, each of the two contiguous symbol regions comprising comprises two columns adjacent to each other,
    a second one of the four bits representing the respective modulation symbol selects one of two contiguous symbol regions of the 16-QAM constellation based on its logical value, each of the two contiguous symbol regions comprising two rows adjacent to each other,
    a third one of the four bits representing the respective modulation symbol selects one of two non-contiguous symbol regions of the 16-QAM constellation based on its logical value, each of the two non-contiguous symbol regions comprising two columns not adjacent to each other, and
    a fourth one of the four bits representing the respective modulation symbol selects one of two non-contiguous symbol regions of the 16-QAM constellation based on its logical value, each of the two non-contiguous symbol regions comprising two rows not adjacent to each other.

5. The method according to claim 4, further comprising the step of associating each data bit of the received modulation symbols that has been mapped by the transmitting apparatus to the first 16-QAM constellation to a data bit of the received modulation symbols that has been mapped by the transmitting apparatus to the second 16-QAM constellation,
  wherein in the step of combining each data bit having been mapped to the first 16-QAM constellation is combined with its associated data bit having been mapped to the second 16-QAM constellation based on the metric of the respective data bit and the metric of the associated data bit to reconstruct the data bit stream.

6. The method according to claim 4 or 5, wherein each of the first 16-QAM constellation and the second 16-QAM constellation has 16 modulation symbols representable in four rows and four columns in a complex coordinate plane, and each modulation symbol of the first and second 16-QAM constellations represents a combination of four bits,
  wherein the modulation symbols $a_{i,j}$ in the first 16-QAM constellation and the modulation symbols $b_{i,j}$ of the second 16-QAM constellation are identified by
    a column index $i \in \{0, 1, 2, 3\}$ indicating the column out of the four columns in which the modulation symbol is located from left to right and
    a row index $j \in \{0, 1, 2, 3\}$ indicating the row out of the four rows in which the modulation symbol is located from top to bottom, and
  wherein the modulation symbols $a_{i,j}$ in the first 16-QAM constellation are rearranged to of modulation symbols $b_{i,j}$ of the second 16-QAM constellation as follows:
  $a_{0,0} \to b_{2,2}, a_{0,1} \to b_{2,0}, a_{0,2} \to b_{2,3}, a_{0,3} \to b_{2,1}$
  $a_{1,0} \to b_{0,2}, a_{1,1} \to b_{0,0}, a_{1,2} \to b_{0,3}, a_{1,3} \to b_{0,1}$
  $a_{2,0} \to b_{3,2}, a_{2,1} \to b_{3,0}, a_{2,2} \to b_{3,3}, a_{2,3} \to b_{3,1}$
  $a_{3,0} \to b_{1,2}, a_{3,1} \to b_{1,0}, a_{3,2} \to b_{1,3}, a_{3,3} \to b_{1,1}$.

7. The method according to claim 4 or 5, wherein each of the first 16-QAM constellation and the second 16-QAM constellation has 16 modulation symbols representable in four rows and four columns in a complex coordinate plane, and each modulation symbol of the first and second 16-QAM constellations represents a combination of four bits,
  wherein the modulation symbols $a_{i,j}$ in the first 16-QAM constellation and the modulation symbols $b_{i,j}$ of the second 16-QAM constellation is identified by
    a column index $i \in \{°0, 1, 2, 3\}$ indicating the column out of the four columns in which the modulation symbol is located from left to right and
    a row index $j \in \{0, 1, 2, 3\}$ indicating the row out of the four rows in which the modulation symbol is located from top to bottom, and wherein the modulation symbols $a_{i,j}$ in the first 16-QAM constellation are rearranged to modulation symbols $b_{i',j'}$ of the second 16-QAM constellation as follows:

$a_{i,j} \to b_{i',j'}$, wherein
  i→i'
  0→2
  1→0
  2→3
  3→1
and
  j→j'
  0→2
  1→0
  2→3
  3→1.

8. A transmission apparatus for transmitting a data bit stream using a first 16-QAM constellation and a second 16-QAM constellation, the transmission apparatus comprising:
  a processing unit configured to form a sequence of data words from the data bit stream, each data word comprising four bits,
  a first symbol mapper configured to map each data word to a modulation symbol using the first 16-QAM constellation to generate a first arrangement pattern of modulation symbols, a second symbol mapper configured to map each data word to a modulation symbol using the second 16-QAM constellation to generate a second arrangement pattern of modulation symbols, and
  a transmitter configured to transmit the first arrangement pattern of modulation symbols and the second arrangement pattern of modulation symbols according to a transmit diversity scheme,
  wherein the second arrangement pattern of modulation symbols is obtained by rearranging the first arrangement pattern of modulation symbols according to the rearrangement rules of FIG. 24:
  wherein the differently dashed arrows indicate the rearrangement of a data word corresponding to a modulation symbol in the first 16-QAM constellation and the same data word corresponding to a modulation symbol in the second, rearranged 16-QAM constellation, wherein the modulation symbol in the first 16-QAM constellation is indicated by the start of an arrow line and the modulation symbol in the second, rearranged 16-QAM constellation is indicated by the end of the arrowhead of the same arrow, and
  wherein each of the first 16-QAM constellation and the second 16-QAM constellation has 16 modulation symbols representable in four rows and four columns in a complex coordinate plane, and each modulation symbol of the first and second 16-QAM constellations represents a combination of four bits,
  wherein each of the first 16-QAM constellation and the second 16-QAM constellation obeys the following mapping rules:
    a first one of the four bits representing the modulation symbol selects one of two contiguous symbol regions of the 16-QAM constellation based on its logical value, each of the two contiguous symbol regions comprising comprises two columns adjacent to each other,
    a second one of the four bits representing the respective modulation symbol selects one of two contiguous symbol regions of the 16-QAM constellation based on its logical value, each of the two contiguous symbol regions comprising two rows adjacent to each other,
    a third one of the four bits representing the respective modulation symbol selects one of two non-contiguous symbol regions of the 16-QAM constellation based on its logical value, each of the two non-contiguous symbol regions comprising two columns not adjacent to each other, and
    a fourth one of the four bits representing the respective modulation symbol selects one of two non-contiguous symbol regions of the 16-QAM constellation based on its logical value, each of the two non-contiguous symbol regions comprising two rows not adjacent to each other.

9. The transmission apparatus according to claim 8, wherein each of the first 16-QAM constellation and the second 16-QAM constellation has 16 modulation symbols representable in four rows and four columns in a complex coordinate plane, and each modulation symbol of the first and second 16-QAM constellations represents a combination of four bits,
  wherein the modulation symbols $a_{i,j}$ in the first 16-QAM constellation and the modulation symbols $b_{i,j}$ of the second 16-QAM constellation are identified by
    a column index $i \gamma \{0, 1, 2, 3\}$ indicating the column out of the four columns in which the modulation symbol is located from left to right and
    a row index $j \in \{0, 1, 2, 3\}$ indicating the row out of the four rows in which the modulation symbol is located from top to bottom, and
  wherein the modulation symbols $a_{i,j}$ in the first 16-QAM constellation are rearranged to modulation symbols $b_{i,j}$ of the second 16-QAM constellation as follows:
    $a_{0,0} \to b_{2,2},\ a_{0,1} \to b_{2,0},\ a_{0,2} \to b_{2,3},\ a_{0,3} \to b_{2,1}$
    $a_{1,0} \to b_{0,2},\ a_{1,1} \to b_{0,0},\ a_{1,2} \to b_{0,3},\ a_{1,3} \to b_{0,1}$
    $a_{2,0} \to b_{3,2},\ a_{2,1} \to b_{3,0},\ a_{2,2} \to b_{3,3},\ a_{2,3} \to b_{3,1}$
    $a_{3,0} \to b_{1,2},\ a_{3,1} \to b_{1,0},\ a_{3,2} \to b_{1,2},\ a_{3,3} \to b_{1,1}$.

10. The transmission apparatus according to claim 8, wherein each of the first 16-QAM constellation and the second 16-QAM constellation has 16 modulation symbols representable in four rows and four columns in a complex coordinate plane, and each modulation symbol of the first and second 16-QAM constellations represents a combination of four bits,
  wherein the modulation symbols $a_{i,j}$ in the first 16-QAM constellation and the modulation symbols $b_{i,j}$ of the second 16-QAM constellation is identified by
    a column index $i \in \{0, 1, 2, 3\}$ indicating the column out of the four columns in which the modulation symbol is located from left to right and
    a row index $j \in \{0, 1, 2, 3\}$ indicating the row out of the four rows in which the modulation symbol is located from top to bottom, and
  wherein the modulation symbols in in the first 16-QAM constellation are rearranged to modulation symbols $b_{i',j'}$ of the second 16-QAM constellation as follows:

$a_{i,j} \to b_{i',j'}$, wherein
    i→i'
    0→2
    1→0
    2→3
    3→1 and j→j'
0→2
1→0
2→3
3→1.

11. A reception apparatus for receiving a data bit stream using a first 16-QAM constellation and a second 16-QAM constellation, the reception apparatus comprising:
a receiver configured to receive a transmission signal comprising data words of the data bit stream having been transmitted using the first 16-QAM constellation, and to receive a transmission signal comprising said data words having been transmitted using the second 16-QAM constellation,
a demodulation unit configured to demodulate the transmission signal by detecting modulation symbols represented by data words of four data bits using the first 16-QAM constellation and the second 16-QAM constellation respectively, thereby associating each data bit of a received modulation symbol with a metric indicating the probability of the logical value of the respective bit of the received modulation symbol or indicating the logical value of the respective bit of the received modulation symbol,
a data bit stream reconstruction unit configured to combine each data bit having been mapped to the first 16-QAM constellation with its associated data bit having been mapped to the second 16-QAM constellation,
wherein the association of data bits within the received modulation symbols is based on the association rules of FIG. 24:
wherein the differently dashed arrows indicate the rearrangement of a data word corresponding to a modulation symbol in the first 16-QAM constellation and the same data word corresponding to a modulation symbol in the second, rearranged 16-QAM constellation, wherein the modulation symbol in the first 16-QAM constellation is indicated by the start of an arrow line and the modulation symbol in the second, rearranged 16-QAM constellation is indicated by the end of the arrowhead of the same arrow, and
wherein each of the first 16-QAM constellation and the second 16-QAM constellation has 16 modulation symbols representable in four rows and four columns in a complex coordinate plane, and each modulation symbol of the first and second 16-QAM constellations represents a combination of four bits,
wherein each of the first 16-QAM constellation and the second 16-QAM constellation obeys the following mapping rules:
a first one of the four bits representing the modulation symbol selects one of two contiguous symbol regions of the 16-QAM constellation based on its logical value, each of the two contiguous symbol regions comprising two columns adjacent to each other,
a second one of the four bits representing the respective modulation symbol selects one of two contiguous symbol regions of the 16-QAM constellation based on its logical value, each of the two contiguous symbol regions comprising two rows adjacent to each other,
a third one of the four bits representing the respective modulation symbol selects one of two non-contiguous symbol regions of the 16-QAM constellation based on its logical value, each of the two non-contiguous symbol regions comprising two columns not adjacent to each other, and
a fourth one of the four bits representing the respective modulation symbol selects one of two non-contiguous symbol regions of the 16-QAM constellation based on its logical value, each of the two non-contiguous symbol regions comprising two rows not adjacent to each other,
each modulation symbol in the first arrangement pattern having two nearest neighbors in the first 16-QAM constellation is associated to a modulation symbol in the second 16-QAM constellation having four nearest neighbors,
each modulation symbol in the first arrangement pattern having three nearest neighbors in the first 16-QAM constellation is associated to a modulation symbol in the second 16-QAM constellation having three nearest neighbors, and
each modulation symbol in the first arrangement pattern having four nearest neighbors in the first 16-QAM constellation is associated to a modulation symbol in the second 16-QAM constellation having two nearest neighbors.

12. The reception apparatus according to claim 11, wherein the data bit stream reconstruction unit is configured to associate each data bit of the received modulation symbols that has been mapped by the transmitting apparatus to the first 16-QAM constellation to a data bit of the received modulation symbols that has been mapped by the transmitting apparatus to the second 16-QAM constellation,
wherein the data bit stream reconstruction unit is further configured to combine each data bit having been mapped to the first 16-QAM constellation with its associated data bit having been mapped to the second 16-QAM constellation based on the metric of the respective data bit and the metric of the associated data bit to reconstruct the data bit stream.

13. The reception apparatus according to claim 11 or 12, wherein each of the first 16-QAM constellation and the second 16-QAM constellation has 16 modulation symbols representable in four rows and four columns in a complex coordinate plane, and each modulation symbol of the first and second 16-QAM constellations represents a combination of four bits,
wherein the modulation symbols $a_{i,j}$ in the first 16-QAM constellation and the modulation symbols $b_{i,j}$ of the second 16-QAM constellation are identified by
a column index $i \in \{0, 1, 2, 3\}$ indicating the column out of the four columns in which the modulation symbol is located from left to right and
a row index $j \in \{0, 1, 2, 3\}$ indicating the row out of the four rows in which the modulation symbol is located from top to bottom, and
wherein the modulation symbols $a_{i,j}$ in the first 16-QAM constellation are rearranged to of modulation symbols $b_{i,j}$ the second 16-QAM constellation as follows:

$a_{0,0} \to b_{2,2}, a_{0,1} \to b_{2,0}, a_{0,2} \to b_{2,3}, a_{0,3} \to b_{2,1}$
$a_{1,0} \to b_{0,2}, a_{1,1} \to b_{0,0}, a_{1,2} \to b_{0,3}, a_{1,3} \to b_{0,1}$
$a_{2,0} \to b_{3,2}, a_{2,1} \to b_{3,0}, a_{2,2} \to b_{3,3}, a_{2,3} \to b_{3,1}$
$a_{3,0} \to b_{1,2}, a_{3,1} \to b_{1,0}, a_{3,2} \to b_{1,2}, a_{3,3} \to b_{1,1}$.

14. The reception apparatus according to claim 11 or 12, wherein each of the first 16-QAM constellation and the second 16-QAM constellation has 16 modulation symbols representable in four rows and four columns in a complex coordinate plane, and each modulation symbol of the first and second 16-QAM constellations represents a combination of four bits, wherein the modulation symbols $a_{i,j}$ in the first 16-QAM constellation and the modulation symbols $b_{i,j}$ of the second 16-QAM constellation is identified by
 a column index $i \in \{0, 1, 2, 3\}$ indicating the column out of the four columns in which the modulation symbol is located from left to right and
 a row index $j \in \{0, 1, 2, 3\}$ indicating the row out of the four rows in which the modulation symbol is located from top to bottom, and
wherein the modulation symbols $a_{i,j}$ in the first 16-QAM constellation are rearranged to modulation symbols $b_{i',j'}$ of the second 16-QAM constellation as follows:

$a_{i,j} \rightarrow b_{i',j'}$, wherein
$i \rightarrow i'$
$0 \rightarrow 2$
$1 \rightarrow 0$
$2 \rightarrow 3$
$3 \rightarrow 1$
and
$j \rightarrow j'$
$0 \rightarrow 2$
$1 \rightarrow 0$
$2 \rightarrow 3$
$3 \rightarrow 1$.

* * * * *

UNITED STATES PATENT AND TRADEMARK OFFICE
CERTIFICATE OF CORRECTION

| | | |
|---|---|---|
| PATENT NO. | : 8,270,531 B2 | |
| APPLICATION NO. | : 13/073736 | |
| DATED | : September 18, 2012 | |
| INVENTOR(S) | : A. G. E. Von Elbwart et al. | |

It is certified that error appears in the above-identified patent and that said Letters Patent is hereby corrected as shown below:

On the Title Page

Item [75] Inventors, incorrectly reads:
"Alexander Golitschek Edler Von Elbwart, Langen (DE); Christian Wengerter, Langen (DE); Isamu Yoshii, Langen (DE)"

and should read:

"Alexander Golitschek Edler Von Elbwart, Darmstadt (DE); Christian Wengerter, Kleinbeubach (DE); Isamu Yoshii, Frankfurt (DE)".

In the Claims:

Column 22, Claim 2, line 37 incorrectly reads:

"of the four columns inl which the modulation symbol".

and should read:

"of the four columns in which the modulation symbol".

Column 22, Claim 2, line 48 incorrectly reads:

" $a_{3,0} \to b_{1,2}, a_{3,1} \to b_{1,0}, a_{3,2} \to b_{1,2}, a_{3,3} \to b_{1,1}.$ "

and should read:

" $a_{3,0} \to b_{1,2}, a_{3,1} \to b_{1,0}, a_{3,2} \to b_{1,3}, a_{3,3} \to b_{1,1}.$ ".

Signed and Sealed this
Twentieth Day of August, 2013

Teresa Stanek Rea
*Acting Director of the United States Patent and Trademark Office*

Column 22, Claim 3, line 56 incorrectly reads:

"constellation and the modulation symbols $b_{i,j}$ the second"

and should read:

"constellation and the modulation symbols $b_{i,j}$ of the second".

Column 23, Claim 4, line 66 incorrectly reads:

"comprising comprises two columns adjacent to each"

and should read:

"comprising two columns adjacent to each".

Column 24, Claim 6, line 47 incorrectly reads:

"constellation are rearranged to of modulation symbols"

and should read:

"constellation are rearranged to modulation symbols".

Column 24, Claim 7, line 62 incorrectly reads:

"a column index i$\epsilon$ {$\underline{°}$0,1,2,3} indicating the column out"

and should read:

"a column index i$\epsilon$ {0,1,2,3} indicating the column out".

Column 25, Claim 8, line 63 incorrectly reads:

"comprising comprises two columns adjacent to each"

and should read:

"comprising two columns adjacent to each".

CERTIFICATE OF CORRECTION (continued)
U.S. Pat. No. 8,270,531 B2

Column 26, Claim 9, line 26 incorrectly reads:

"a column index i$\gamma$ {0,1,2,3} indicating the column out"

and should read:

"a column index i$\in$ {0,1,2,3} indicating the column out".

Column 26, Claim 9, line 38 incorrectly reads:

"$a_{3,0} \to b_{1,2}, a_{3,1} \to b_{1,0}, a_{3,2} \to b_{1,2}, a_{3,3} \to b_{1,1}$."

and should read:

"$a_{3,0} \to b_{1,2}, a_{3,1} \to b_{1,0}, a_{3,2} \to b_{1,3}, a_{3,3} \to b_{1,1}$."

Column 26, Claim 10, line 55 incorrectly reads:

"wherein the modulation symbols in in the first 16-QAM"

and should read:

"wherein the modulation symbols $a_{i,j}$ in the first 16-QAM".

Column 28, Claim 13, line 55 incorrectly reads:

"constellation are rearranged to of modulation symbols".

and should read:

"constellation are rearranged to modulation symbols".

Column 28, Claim 13, line 56 incorrectly reads:

"$b_{i,j}$ the second 16-QAM constellation as follows:".

and should read:

"$b_{i,j}$ of the second 16-QAM constellation as follows:".

Column 28, Claim 13, line 60 incorrectly reads:

"$a_{3,0} \to b_{1,2}, a_{3,1} \to b_{1,0}, a_{3,2} \to b_{1,2}, a_{3,3} \to b_{1,1}$."

and should read:

"$a_{3,0} \to b_{1,2}, a_{3,1} \to b_{1,0}, a_{3,2} \to b_{1,3}, a_{3,3} \to b_{1,1}$."